US012794927B2

(12) United States Patent
Jain et al.

(10) Patent No.: US 12,794,927 B2
(45) Date of Patent: Nov. 10, 2026

(54) PERSONALIZED VISUAL INTERFACES FOR QUANTIFYING AND COMMUNICATING PERSONALIZED PHISHING EXPOSURE RISK FOR INCREASED SECURITY

(71) Applicant: AMERICAN EXPRESS TRAVEL RELATED SERVICES COMPANY, INC., New York, NY (US)

(72) Inventors: Paridhi Jain, Phoenix, AZ (US); Dirk B. White, Phoenix, AZ (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 45 days.

(21) Appl. No.: 18/781,656

(22) Filed: Jul. 23, 2024

(65) Prior Publication Data

US 2026/0032142 A1 Jan. 29, 2026

(51) Int. Cl.
*H04L 9/40* (2022.01)
*G06Q 10/0635* (2023.01)

(52) U.S. Cl.
CPC ..... *H04L 63/1433* (2013.01); *G06Q 10/0635* (2013.01); *H04L 63/1483* (2013.01)

(58) Field of Classification Search
CPC ............ H04L 63/1433; H04L 63/1483; G06Q 10/0635
See application file for complete search history.

(56) References Cited

U.S. PATENT DOCUMENTS

| | | | | |
|---|---|---|---|---|
| 8,719,940 | B1 * | 5/2014 | Higbee | H04L 63/1483 709/206 |
| 9,253,208 | B1 * | 2/2016 | Koshelev | H04L 63/20 |
| 10,623,441 | B2 * | 4/2020 | Chapman | G06Q 10/0635 |
| 11,374,970 | B2 * | 6/2022 | Kolingivadi | H04L 63/20 |
| 12,375,523 | B2 * | 7/2025 | Chechik | H04L 63/1483 |

(Continued)

FOREIGN PATENT DOCUMENTS

| | | | |
|---|---|---|---|
| EP | 2889792 A1 * | 7/2015 | G06F 21/31 |
| EP | 3930286 A1 * | 12/2021 | H04L 51/42 |

(Continued)

*Primary Examiner* — Sarah Su
(74) *Attorney, Agent, or Firm* — Sterne, Kessler, Goldstein & Fox, P.L.L.C.

(57) ABSTRACT

System, method, and computer program product embodiments quantify and communicate phishing exposure risk to increase enterprise security. The phishing exposure risk management system may retrieve metrics for a user related to real-world and simulated phishing attempts and the user's organizational attributes to quantify the user's risk of being targeted by phishing attempts. The phishing exposure risk management system may use a score calculation service to quantify a user's risk of being targeted in phishing attempts. The score calculation service may use phishing data stored in a database and metric extraction service to quantify the risk for a recipient user in a phishing exposure risk score. Upon request or update of the score, the user may receive a notification with a message including the user's phishing exposure risk score and the details of the metrics contributing to their phishing exposure risk score. Network security protocols may be automatically adjusted based on the phishing exposure risk score.

20 Claims, 7 Drawing Sheets

(56) References Cited

U.S. PATENT DOCUMENTS

| | | | | |
|---|---|---|---|---|
| 2015/0222654 | A1* | 8/2015 | Crowley | H04L 67/10 726/25 |
| 2016/0014151 | A1* | 1/2016 | Prakash | H04L 47/62 726/22 |
| 2017/0257397 | A1* | 9/2017 | Graham | H04L 63/20 |
| 2018/0375877 | A1* | 12/2018 | Jakobsson | G06F 16/955 |
| 2019/0028509 | A1* | 1/2019 | Cidon | H04L 63/1425 |
| 2019/0319987 | A1* | 10/2019 | Levy | G06F 21/45 |
| 2021/0058422 | A1* | 2/2021 | Obrecht | H04L 63/1416 |
| 2021/0272066 | A1* | 9/2021 | Bratman | G06Q 10/107 |
| 2021/0312400 | A1* | 10/2021 | Irimie | H04L 63/1416 |
| 2023/0126692 | A1* | 4/2023 | Ben David | H04L 63/1433 726/22 |
| 2023/0231854 | A1* | 7/2023 | Blake | H04L 63/1425 726/4 |
| 2023/0239303 | A1* | 7/2023 | Hutelmyer | H04L 63/102 726/4 |
| 2023/0328034 | A1* | 10/2023 | Behera | H04L 63/1408 726/22 |
| 2024/0214409 | A1* | 6/2024 | Zahavi | G06N 20/00 |
| 2024/0356968 | A1* | 10/2024 | Sinks | H04L 41/16 |
| 2025/0202938 | A1* | 6/2025 | Cavallaro | G09B 5/065 |
| 2025/0286909 | A1* | 9/2025 | Goodsitt | H04L 63/1433 |

FOREIGN PATENT DOCUMENTS

| | | | | |
|---|---|---|---|---|
| GB | 2462456 | A * | 2/2010 | H04L 63/1441 |
| WO | WO-2019108620 | A1 * | 6/2019 | H04L 51/212 |
| WO | WO-2019207574 | A1 * | 10/2019 | H04L 63/1483 |
| WO | WO-2022093007 | A1 * | 5/2022 | G06N 3/0464 |
| WO | WO-2023283356 | A1 * | 1/2023 | H04L 63/1416 |
| WO | WO-2023023171 | A1 * | 2/2023 | H04L 63/104 |
| WO | WO-2024145598 | A1 * | 7/2024 | H04L 63/10 |
| WO | WO-2024246711 | A1 * | 12/2024 | H04L 63/1483 |
| WO | WO-2025042326 | A1 * | 2/2025 | H04L 9/30 |
| WO | WO-2025226915 | A1 * | 10/2025 | H04L 51/212 |

* cited by examiner

PERSONALIZED VISUAL INTERFACES FOR QUANTIFYING AND COMMUNICATING PERSONALIZED PHISHING EXPOSURE RISK FOR INCREASED SECURITY

BACKGROUND

Field

This field is generally related to quantifying and personalizing phishing exposure risk on an individual-recipient basis and communicating the individual quantified risk via personalized visual interfaces and/or automatically adjusting network security protocols to improve the security function of an enterprise network.

Related Art

Phishing attempts represent a prominent security threat for enterprise networks. Existing anti-phishing software works by blocking or quarantining suspected phishing messages.

BRIEF SUMMARY

Disclosed herein are system, apparatus, device, method and/or computer program product embodiments, and/or combinations and sub-combinations thereof, for an improved graphical user interface (GUI) that is customized based on dynamic visual elements that are updated to reflect personalized quantified phishing exposure risk on a per-individual basis within an enterprise network, and communicating the quantified risk via personalized visual interfaces to improve the security function of an enterprise network. The system may personalize the visual elements for users based on various metrics, e.g., previous phishing simulation results, periodic real-world phishing emails, and/or individuals' organization attributes, to assess an individual's risk of being targeted by attackers sending phishing electronic communications. The system generates personalized quantifications of susceptibility risks within an enterprise network, where the risk may be quantified in a personalized phishing exposure risk score and a personalized likelihood of failure when a phishing attempt is made by an attacker. The system may identify one or more visual elements associated with the individual, update the visual element(s) based on the score, and the updated visual element may be incorporated into a personalized user interface that may then be communicated to the individual as along with, in some instances, security resources, e.g., security training, points-of-contact, and/or additional security or phishing-related resources. The personalized visual elements comprising the phishing exposure risk score and likelihood of failure may, for example, be visually presented to the user using an internally hosted webpage. The phishing exposure risk score for an individual may be periodically updated if and when the individual's metrics change, e.g., after failing a phishing attempt, after participating in a phishing simulation, or after a change in an organization attribute, such as a promotion or title change. The quantified risk and communication may allow organizations to increase security and prevention of phishing attacks by proactively assessing an individual's risk of being targeted and/or increasing security awareness and training at the individual level. Further, anti-phishing software may be updated to include an individual's phishing exposure risk. Stricter filtering and/or security protocols may be implemented for individuals with high phishing exposure risk scores. This may allow the system to efficiently utilize computer resources by efficiently applying increased security software and protocols.

Computer-implemented methods, systems, and non-transitory computer-readable devices as described herein proactively increase a computer network's security against phishing attempts by generating a GUI with personalized visual elements to communicate the quantified risk of being targeted (e.g., exposed) in a phishing attempt as well as the likelihood of failing the phishing attempt for each individual in an enterprise organization. The quantified risk may be a phishing exposure risk score comprising a first score and a second score. The first score may be a target likelihood score generated based on responses to real-world phishing attempts, individual recipient attributes related to the individual's position in the enterprise organization (e.g., job title, hire date, privilege access, etc.), and/or periodically simulated phishing attempts. The second score may be a failure likelihood score generated to determine the likelihood of failure using the same or a subset of the metrics used to determine the first score. Phishing exposure risk scores can be generated for each individual to quantify the individual's respective risk for being targeted and failing future phishing attempts. In turn, the system then generates a GUI with visual elements that indicate the phishing exposure risk score, including the first score and the second score, for each individual. The visual elements may be personalized for the individual based on the individual's phishing exposure risk score. Both parts of the score are then communicated to the individual and presented via the GUI. Along with the quantified risk, the system may provide the individual with updated security resources and/or detailed information regarding the individual's quantified risk via the selected visual elements of the GUI.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
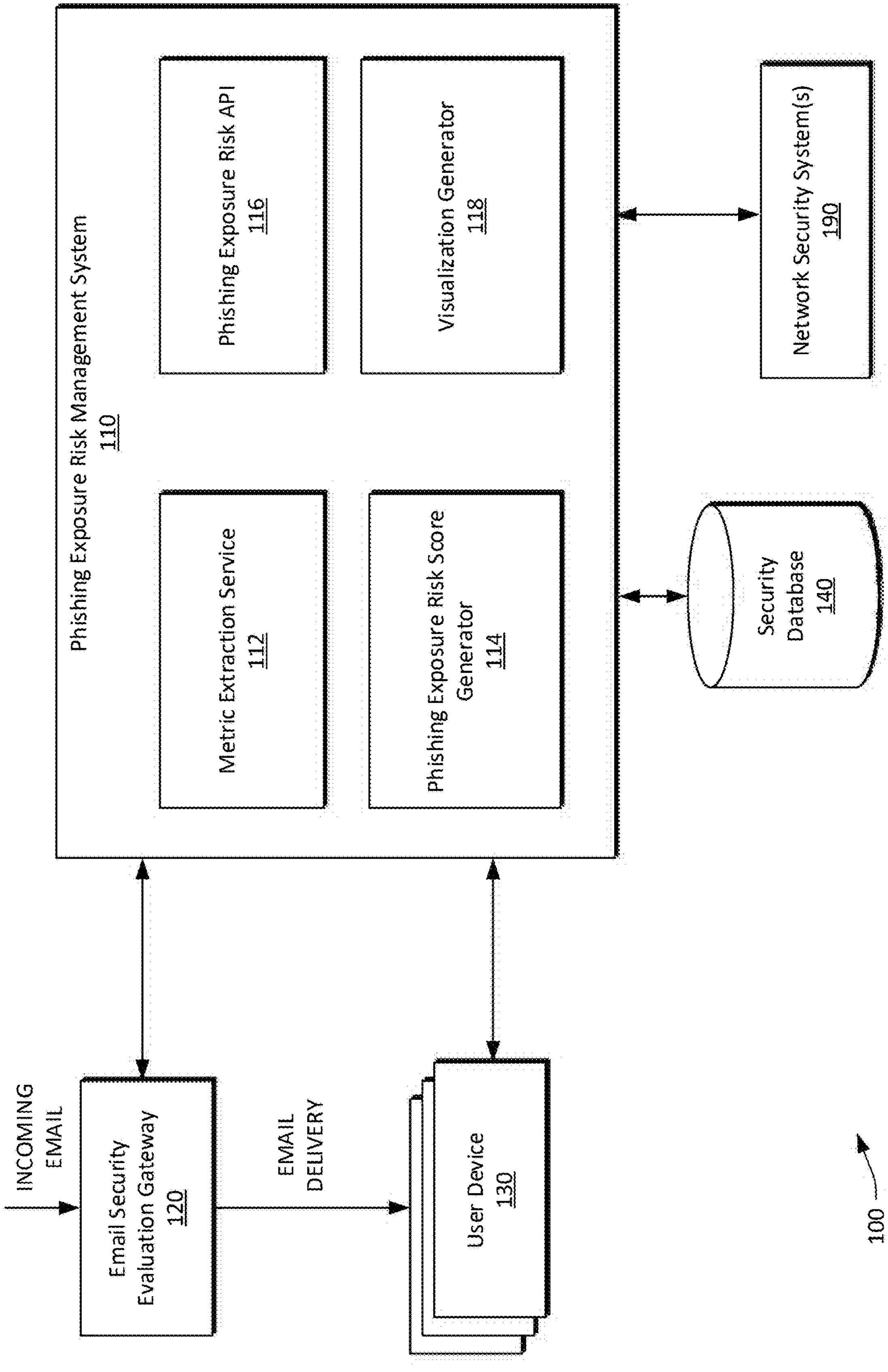
FIG. 1 is a block diagram of a phishing exposure risk management environment, according to some embodiments.

Because phishing attackers can engineer messages that can bypass advanced anti-phishing software and filters that would otherwise block and/or quarantine obvious or egregious phishing attempts, effective anti-phishing strategies more beneficially promote individual participation and vigilance in security practices. Awareness of phishing risks and wariness to potential phishing attempts when assessing incoming electronic communications, on the part of individuals, e.g., employees, in an enterprise organization, remains a more effective approach than filters alone. Security training to promote individual phishing threat awareness and wariness conventionally involves educating employees of an enterprise organization on common phishing practices, and may simulate phishing attempts. For example, employees of an enterprise organization who may be recipients of email phishing attacks may receive a training to provide awareness of common phishing practices, and then may receive a follow-up simulated phishing attempt as an electronic communication (e.g., email or text message). Users who failed the simulated phishing attempt by, e.g., following links, compromising credentials, and/or providing sensitive information, may be tracked and addressed. Non-failing interactions with the simulated phishing attempt, such as user reports of the simulated phishing attempt or user deletions or flags of the simulated phishing attempt, may also be tracked. Anti-phishing filtering and awareness tracking systems can be implemented organization-wide and individual cases can be escalated for more in-depth training in response to a failure and repeated failures may be tracked.

Retroactively tracking individuals' phishing attempt failures provides some security benefit for individuals to be tested via simulated phishing attempts, who may receive immediate feedback regarding their interaction. For example, an individual may receive an electronic message notifying the individual that the individual failed a simulated phishing attempt by clicking a link in the simulated phishing attempt. However, such retroactive tracking is limited in providing increased security and in automatedly distributing security resources because it only provides information on a case-by-case basis on previously failed attempts. Further, it is limited to providing useful feedback only to individuals who fail the phishing attempt or otherwise interact with the phishing attempt in trackable ways. Individuals who do not interact with the simulated phishing attempt may not be assessed.

Provided herein are system, apparatus, device, method and/or computer program product embodiments, and/or combinations and sub-combinations thereof, for a system for quantifying and personalizing phishing exposure risk such that a likelihood of failing future phishing attempts is provided for different users within an enterprise network to provide increased security for that network on a personalized basis. Rather than focusing solely on identifying the risk of an electronic message (e.g., an email) entering the enterprise network, features of the systems, methods, and computer-readable devices described herein include an additional security layer by identifying susceptibility risks within the enterprise network and modifying the behavior of the security system based on both the message risk and the susceptibility risk, which results in improved personalized phishing security. An example result of the features described herein is that the same inbound phishing message, received by multiple individual users of an enterprise network, may result in different personalized visual interfaces being presented to the different individual users based on the personalized susceptibility risk associated with each user, quantified as described herein. Another example result of the features described herein is that the same inbound phishing message, received by multiple individual users of an enterprise network, may result in different security resources (e.g., anti-phishing or anti-malware software) being provided to or configured for the different individual users based on the personalized susceptibility risk associated with each user, quantified as described herein. The security function of a security system is improved by providing personalized visual interfaces and/or security resource assignment or configuration tailored on an individual basis to prevent phishing attempts either from intruding into the enterprise network or, for those that intrude, from compromising credentials, resources, or sensitive information of the enterprise.

In some embodiments, the systems, methods, and computer-readable devices described herein may be used to provide a framework for using dynamic GUIs with personalized visual elements for increasing security against phishing attempts via messages, such as email. The framework may generate a personalized GUIs comprising dynamic visual elements to communicate the phishing exposure risk of the individual quantified in the first score and the second score of the phishing exposure risk score. Visual elements are generated based on generating personalized phishing exposure risk scores to individuals of an enterprise organization. An example of a visual element may be stylized as a personalized score card that visually illustrates the phishing exposure risk score of the individual. The score card may include a link or image of one or more suspected phishing emails an individual has interacted with. The system may provide detailed information on how the phishing exposure risk score is personalized to reflect the individual's attributes and interactions with phishing attempts in the past, simulated or real-world. The personalized score card may also include additional phishing training information for the individual to use to improve the individual's security awareness, reduce the individual's security risk, and thereby enhance the network security of the enterprise.

In some embodiments, the systems, methods, and computer-readable devices described herein may automatically dynamically update security protocols for each individual based on the phishing exposure risk scores of the individuals in an enterprise organization. The security protocols can include or incorporate any of security software or systems (such as encryption, anti-virus, anti-malware, anti-spam, access control, and identity authentication software or systems), security controls, security plans, security credentials, network authorities, network powers, network permissions, network security training assets, and/or physical access to enterprise equipment (e.g., computers or mobile devices), and/or other resources. Network security resources may be automatically efficiently allocated within the enterprise system, and users can be automatically blocked from accessing certain enterprise hardware or software resources, based on the determined susceptibility of the users. For example, individuals with high phishing exposure risk scores, indicating a likelihood of being a phishing target and/or failing a phishing attempt, may receive additional security, anti-malware, anti-spam resources, or similar security resources. Where such resources consume network resources (e.g., bandwidth of network connections and/or processor cycles of network computing devices) or incur other per-user costs (e.g., license costs), the efficient allocation of such resources only to those more susceptible individuals improves the functioning of the computer network. As another example, a security protocol may adjust the access control of a quantified high-risk individual user to prevent that user from accessing certain areas of a physical premises, or to prevent that user from accessing or installing certain computer resources, virtual spaces, stored data, content, or software. Individuals with lower phishing exposure risk scores may not need as intensive security resources or controls to prevent a breach or compromise due to a phishing attack, and therefore may be automatically assigned a different security protocol by the systems, methods, and computer-readable devices described herein than the individuals with higher phishing exposure risk scores.

Various embodiments of these features are discussed with respect to the corresponding figures.

FIG. 1 is a block diagram of a phishing exposure risk management environment 100, according to some embodiments. Phishing exposure risk management environment 100 includes phishing exposure risk management system 110, email security evaluation gateway 120, user device(s) 130, and security database 140. In some embodiments, phishing exposure risk management system 110 may include metric extraction service 112, phishing exposure risk score generator 114, phishing exposure risk application programming interface (API) 116, and/or visualization generator 118. Phishing exposure risk management system 110 may determine a phishing exposure risk score for individuals, e.g., employees, of an enterprise organization using phishing exposure risk score generator 114. Phishing exposure risk score generator 114 may use metric extraction service 112 and/or data from security database 140 to determine a phishing exposure risk score for an individual.

The phishing exposure risk score may be personalized to the individual. The phishing exposure risk score may indicate to the individual the likelihood that the individual may be targeted by attackers using phishing attempts. In some embodiments, the phishing exposure risk score may include a first score and a second score. As described above, the first score may represent the likelihood that the individual may be a target of phishing attacks. The second score may represent the likelihood the individual will fail the phishing attempt, e.g., expose compromising information or data to the attackers. For example, the phishing exposure risk score may provide the individual with a probability that they will be targeted in a phishing attempt by an attacker. Certain individuals in an enterprise organization may be more or less likely to be the target of phishing attempts. For example, someone in accounting or with high access to privileged or sensitive data may be a more desirable target for attackers.

Similarly, if an individual has previously failed phishing attempts, real-world and/or simulated, that individual may be a more desirable target. These metrics containing information specific to the individual may be retrieved by metric extraction service 112 and used to generate a probabilistic phishing exposure risk score for the individual. In some embodiments, phishing exposure risk score generator 114 may also generate the second part of the phishing exposure risk score for the individual, which indicates the likelihood the individual will fail the phishing attempt. Phishing exposure risk management system 110 may use metric extraction service 112 and/or security database 140 to determine previous real-world and simulated phishing attempt failures for the individual, if any, and generate a probabilistic likelihood that the individual will fail a phishing attempt if and when they are targeted by an attacker.

Phishing exposure risk management system 110 may generate visual elements for integration into a GUI. The visual element may be updated to include the personalized phishing exposure and be communicated to the user device 130 associated with the individual using phishing exposure risk API 116 and/or visualization generator 118. In some embodiments, visualization generator 118 may generate a personalized score card for each individual in an enterprise organization. The score card may contain detailed information regarding the individual's phishing exposure risk score, e.g., the likelihood of the individual being targeted and the second score of likelihood of failing a phishing attempt. The personalized score card may also contain information regarding security practices of the enterprise organization relating to phishing attacks as well as examples of failed phishing attempts, real-world and/or simulated, of the individual. This allows the individuals of an enterprise organization to understand their respective personal risk and responsibility in security training and awareness.

The phishing exposure risk management system 110 also proactively provides individuals of an enterprise system with the ability to understand their respective risk on a personal level, rather than the generalized risk of an organization. By connecting the personalized phishing exposure risk score and likelihood of failing future phishing attempts with a real-world or simulated failure, phishing exposure risk management system 110 improves network security. Security resources may also be distributed more efficiently based on the personalized phishing exposure risk scores of individuals in an enterprise organization. For example, individuals with high phishing exposure risk scores, indicating a higher likelihood of being targeted in a phishing attack, may receive user devices with additional security measures and/or their accounts within the enterprise system may have stricter security protocols enforced. Similarly, an individual with a low phishing exposure risk score related to targeted phishing attempts, but a high likelihood of failure in a real-world phishing attack, may also receive additional security training and/or enforcement.

In some embodiments, email security evaluation gateway 120 may be a security enterprise system that is responsible for implementing security protocols such anti-spam, anti-malware, authentication services for incoming emails in an enterprise system. Email security evaluation gateway 120 may first categorize emails received by individuals as safe email or a suspected phishing attempt. Emails that are considered safe may be delivered to user device(s) 130 without further action. Emails that are considered suspected phishing attempts may be further categorized as blocked emails or suspicious emails. In some embodiments, emails that are considered suspect (blocked or suspicious) may be transmitted to phishing exposure risk management system 110 periodically. In some embodiments, suspected-blocked emails may not be delivered to the enterprise recipients and suspected-suspicious emails may be forwarded to the enterprise recipients. In both cases, the emails may be forwarded to phishing exposure risk management system 110 for further review and metric extraction. In some embodiments, email security evaluation gateway 120 may be a licensed tool or an internal network or cyber security system, such as network security system 190.

Phishing exposure risk management system 110 may use metric extraction service 112 to identify one or more sender domains and/or one or more recipients of the email as well as the date of the email. Phishing exposure risk management system 110 can track individuals of an enterprise organization as recipients in emails. In some embodiments, metric extraction service may further extract details on the contents of the email to further identify and categorize phishing attempts. In some examples, metric extraction service may extract metadata associated with email messages. Metric extraction service 112 may store information extracted from email contents and/or metadata in security database 140 to track how individuals interact with the email when it is transmitted to user device(s) 130. Metric extraction service 112 may use this data to curate additional metrics, such as, for example, the unique sender domains of emails that are categorized as suspected phishing attempts. This may help the system determine if a particular recipient is being targeted by a certain domain or type of phishing attempt. Metric extraction service 112 may also track unique sender domains that sent an email to a particular individual of the enterprise organization in within a given time period. Such metrics can include, for example, that one employee has received two suspected phishing attempts in a month and another has received fifteen. These two employees may have personalized phishing exposure risk scores that are different and may have different security training and enforcement consequences as a result.

Metric extraction service 112 may also determine attributes of the individual recipient related to the individual recipient's employment with the enterprise organization. For example, metric extraction service 112 may identify a recipient in a suspect phishing email and record the recipient's band or level in the enterprise organization, hire date, access to sensitive or compartmentalized data, and similar attributes that may be contribute to phishing attackers targeting an individual of an enterprise organization. Additionally, security database 140 may store the collected data of a recipient, and metric extraction service 112 may determine if the recipient has been involved in any real-world past security breaches or public listings and/or if they are a recipient of a recent reconnaissance email from the sender domain. Similarly, metric extraction service 112 may determine whether the recipient has failed simulated phishing attempts. In some embodiments, metric extraction service 112 may only retrieve security data from security database 140 for a given period of time, e.g., security data of a recipient for the past six months. This may also prompt recipients to improve their security behavior regarding phishing attempts. Depending on the application and security requirements of a given enterprise organization, the phishing exposure risk score may be based only on information from a certain period of time, e.g., the past six months or the previous year, or it may be representative of the recipient's entire history. In some embodiments, metric and attribute extraction by metric extraction service 112 may be personalized for individual recipients or groups of recipients. For example, recipients in a certain group or department may have metrics from a different time period contribute to their personalized phishing exposure risk scores than recipients in other groups or departments. Recipients may be grouped by position, band, title, security history, hire date, or any other distinguishing factor that may contribute to attackers targeting them with phishing attempts.

Phishing exposure risk management system 110 may receive information about the interactions of the recipients with simulated or real-world phishing attempts via user device(s) 130. Email security evaluation gateway 120 may forward emails from external sender domains to user device (s) 130. In some embodiments, phishing exposure risk management system 110 and/or email security evaluation gateway 120 may generate simulated phishing emails to perform routine phishing tests and collect security data for the recipients of the simulated phishing emails. For example, phishing exposure risk management system 110 may perform random simulated phishing tests quarterly for recipients. In some embodiments, simulated phishing attempts may be performed at an increased or decreased rate based on the phishing score of the recipients, e.g., individuals in the enterprise organization. User device(s) 130 may be a personal computer, laptop computer or other personal computing device capable of communicating with phishing exposure risk management system 110 and/or via a network. For example, phishing exposure risk management system 110 may be implemented on an enterprise computing platform. User device(s) 130 may communicate with the enterprise computing platform to receive emails. Phishing exposure risk management system 110 may then receive information based on how the recipient interacts with the email via user device 130.

In some embodiments, phishing exposure risk score generator 114 may use the metrics extracted by metric extraction service 112 and/or stored in security database 140 to generate a personalized phishing exposure risk score for the recipient. In some embodiments, the phishing exposure risk score may comprise two parts: a first score associated with the recipient's likelihood of being targeted in a phishing attempt, and a second score associated with the recipient's likelihood of failing a phishing attempt from an attacker. As described above, the metrics may be recipient attributes related to the enterprise organization and/or security data associated with the recipient's previous experience with simulated and real-world phishing attempts. Phishing exposure risk score generator 114 may apply a weight to each of the metrics, e.g., recipient attributes and/or security data, which may be combined to determine a phishing exposure risk score for the recipient.

Phishing exposure risk score generator 114 may assign a weight to the metrics extracted by metric extraction service 112 and/or stored in security database 140. The metrics can be assigned a probabilistic weight and can be combined to determine the personalized phishing exposure risk score of a recipient. Each of the individual metrics, e.g., recipient attributes and/or security data, can be defined as independent features and can be assigned their own respective weights. The phishing exposure risk score, the probability that a recipient may be the target of a phishing attempt, may be calculated by multiplying the individual probabilities (e.g., assigned weights) of the metrics extracted and stored by metrics extraction service 112 and security database 140, respectively. In some embodiments, more sophisticated calculation methods may be used to determine the phishing exposure risk score. In some embodiments, phishing exposure risk score generator 114 may use generative artificial intelligence and/or machine learning models to further personalize and predict the likelihood of a recipient being targeted. Individual recipient attributes and/or security data may be assigned different classes and/or conditional weights. One or more machine learning models such as generative artificial intelligence (AI) models and/or may also be used to check the accuracy of the phishing exposure risk score of the recipient. The models may be trained using phishing exposure risk scores of recipients.

In some embodiments, phishing exposure risk score generator 114 may generate a second part to the personalized phishing exposure risk score of the recipient. The second part of the score may be a second likelihood which represents the likelihood the recipient may fail a phishing attempt. Phishing exposure risk score generator 114 may use the metrics and/or security data used to determine the likelihood the recipient will be a target of a phishing attempt. In some embodiments, phishing exposure risk score generator 114 may use a naive Bayes algorithm to calculate the probability the recipient will fail a phishing attempt.

Phishing exposure risk score generator 114 may also generate a score card to visually display the personalized phishing exposure risk score of the individual email recipient. The score card may be displayed on a user device 130 of the individual via the phishing exposure risk API 116. A user device 130 of an individual may access the phishing exposure risk API 116 to display the score card, that is, to display details of the individual's personalized phishing exposure risk score, to a display of the user device 130. As examples, the personalized score card may be displayed as a web page within a web browser or as a screen of a mobile device application ("app"). The score card may visually display both the first score, the likelihood that the individual may be a target of a phishing attempt, and the second score, the likelihood that the individual may fail a phishing attempt. The personalized score card may additionally visually display trends of the individual recipient. For example, the personalized score card may display a graph of the number of sender domains targeting the individual. Additionally, the score card may display further details on the types of sender domains that have targeted the individual with phishing attempts. The personalized score card may provide further details as to the types of content that frequently appear in the email phishing attempts. The personalized score card can be customized to the individual to allow the participant to proactively learn the participant's habits and security risk.

The personalized score card and phishing exposure risk score can be generated automatically by phishing exposure risk score generator 114 after the individual joins the enterprise organization. During the individual's tenure in the enterprise organization, the individual's personalized phishing exposure risk score may change significantly and may be updated periodically or intermittently by phishing exposure risk score generator 114. Review of the personalized phishing exposure risk score, and/or remedial actions (e.g., assignment of remedial security procedures coursework) that may be based on the personalized phishing exposure risk score, may prompt the individual to adjust the individual's behavior accordingly and thereby reduce the individual's security risk. In some embodiments, the personalized score card may compare the phishing exposure risk score of the individual with the personalized phishing exposure risk scores of the individual's peers in the enterprise organization. For example, the personalized score card may compare the first score of the phishing exposure risk score with individuals with similar recipient attributes. In some embodiments, the personalized score card may compare the second score of the phishing exposure risk score to individuals with similar first scores, who receive phishing attempts from the same or similar sender domains, or may provide a different or an additional comparison that may be beneficial in communicating the security risk of the recipient.

Phishing exposure risk API 116 may be hosted internally by a server of the enterprise organization. The personalized phishing exposure risk score and score card may contain sensitive data that would present a security risk if the API was hosted externally. User device(s) 130 may access the personalized phishing exposure risk score and/or personalized score card through a webpage of the phishing exposure risk API 116. In some embodiments, to access the phishing exposure risk API 116 and view the personalized score card, individuals must be authenticated to prevent disclosure of secure and/or sensitive information. For example, an employee may enter an employee contractor number (ECN) via a user device 130 so that the phishing exposure risk management system 110 may authenticate the employee before providing access to the employee's personalized score card and/or phishing exposure risk score. In some embodiments, other methods of authentication and/or encryption may be used, such as two-factor authentication using token public/private keys, along with or independent of additional hardware-implemented security.

In some embodiments, the phishing exposure risk API 116 may include or communicate with a messaging application to allow a user to request access to the user's personalized phishing exposure risk score, without necessarily accessing the user's entire personalized score card. For example, and as described in further detail with regard to FIG. 3, an individual may request the individual's phishing exposure risk score using an internal messaging service. The internal messaging service may provide the individual with the individual's up-to-date phishing exposure risk score and some details of the score. The message may also provide links to the more detailed personalized score card accessible through phishing exposure risk API 116 and/or security training and resources of the enterprise organization.

Phishing exposure risk API 116 may transmit the personalized visualization elements to each individual. However, the personalized phishing exposure risk scores of individuals of an enterprise organization may be intermittently or periodically updated to include metrics from additional security data and/or changes in recipient attributes. Phishing exposure risk score generator 114 may update the phishing exposure risk score of the individual and visualization generator 118 may update the visual elements for the GUI displayed via exposure risk API 116. For example, the visual elements displaying the personalized first score and/or second score may be updated to the updated first and/or second score. As an example, visualization generator 118 may add to the personalized score card a visual element that compares the change in the updated phishing exposure risk score.

After email security evaluation gateway 120 receives a suspected phishing email identifying one or more individual recipients, the phishing exposure risk score generator 114 may update personalized phishing exposure risk scores of those individual recipients. Phishing exposure risk score generator 114 may update the first score and/or the second score independently. That is, updating one score does not mean that the other score need necessarily change. As a result, visualization generator 118 may update the respective visual elements of the GUI, e.g., the score card, displaying the personalized phishing exposure risk score.

Visualization generator 118 may also transmit one or more notifications to user device(s) 130, e.g., email recipients or individual user devices, indicating that the addressed individuals' personalized phishing exposure risk score and corresponding GUI, e.g., score card, has been updated and the personalized phishing exposure risk score and/or score card may be accessed via phishing exposure risk API 116. As similarly described above, visualization generator 118 may use a messaging application to communicate the updated phishing exposure risk score to the individual. In some embodiments, visualization generator 118 may transmit a message to a user device associated with the individual indicating that the personalized exposure score has been updated and is ready to be viewed. The message may include a visual element that is configured to receive authentication information, such as an ECN of the individual, directly within the message and, based on a successful authentication of the authentication information, display an abbreviated (e.g., "quick view") of the updated, personalized score with some details. That is, the message may include different visual elements that may be hidden or displayed as appropriate on the user device. The notification may also include links to access the detailed score card, security training and/or resources, and/or instruction on handling suspected phishing attempts.

In some embodiments, when the personalized phishing exposure risk score has been updated after receiving a suspected phishing attempt, failing a simulated or real-world phishing attempt, or similar situations, the notification may also include information regarding the specific situation which caused the personalized phishing exposure risk score of the individual to be updated. This allows the individual recipient of the suspected or simulated phishing attempt to see how the individual's specific interactions and metrics have influenced the individual's personalized phishing exposure risk score. As described above, the personalized score card may include additional information comparing the personalized phishing exposure risk score of the individual with peers in the enterprise organization. In some embodiments, recipients of the same or similar phishing emails may be compared so that individuals may understand how their specific interactions and metrics influence their phishing exposure risk score, both the first and second scores, compared to their peers in the same or similar situations.

In some embodiments, security database 140 may be a data storage system used to house information relevant to, used in, and stored by phishing exposure risk management system 110. For example, security database may include a database management system, relational database tool, vector database tool, and/or associated components. Security database 140 may be housed locally within the enterprise organization or be a cloud-based system accessible using a network. Security database 140 may be a data lake, data silo, semi-structured data system (CSV, logs, XML, etc.), unstructured data system, binary data repository, or other suitable repository.

In some embodiments, the phishing exposure risk management environment 100 may also include a network security system 190 of the enterprise organization. The network security system 190 may be configured to automatically and dynamically adjust security protocols, e.g., based on phishing exposure risk scores communicated from phishing exposure risk management system 110. Such security protocols can include or incorporate any of security software or systems (such as encryption, anti-virus, anti-malware, anti-spam, access control, and identity authentication software or systems), security controls, security plans, security credentials, network authorities, network powers, network permissions, network security training assets, and/or physical access to enterprise equipment (e.g., computers or mobile devices), and/or other resources.

Informed with phishing exposure risk scores for users within the enterprise organization, as communicated from phishing exposure risk management system 110, network security system 190 can automatically efficiently allocate network security resources within the enterprise system, and users can be automatically blocked from accessing certain enterprise hardware or software resources. As one example, after phishing exposure risk management system 110 communicates a new or updated phishing exposure risk score for a user to network security system 190, network security system 190 can then automatically allocate a network resource to the user based on the user having a high phishing exposure risk score (e.g., a phishing exposure risk score that exceeds a threshold, or is within a threshold high percentile among all phishing exposure risk scores of all users in the organization). For example, the network security system 190 can automatically install anti-malware on a user device of the user on this basis. As another example, after phishing exposure risk management system 110 communicates a new or updated phishing exposure risk score for a user to network security system 190, network security system 190 can then automatically limit an access privilege of the user based on the user's personalized phishing exposure risk score. For example, the network security system 190 can automatically reduce the user's permissions level or limit the user's access to certain sensitive data or systems on this basis. The level of permissions reduction, or which systems may be barred from user access, may, for example, be defined by a network administrator, or may be automatically determined based on a machine learning model and/or the phishing exposure risk score. In some examples, phishing exposure risk management system 110 can itself be configured to automatically and dynamically adjust the security protocols, without resort to an external network security system.

As described above, generating personalized GUI with dynamic visual elements representing personalized phishing exposure risk scores not only increases security awareness and training within an enterprise organization, but also allows the enterprise organization to allocate training and network security resources adequately and efficiently. Based on the personalized GUI and phishing exposure risk score, transmitted to the security system 190 by phishing exposure risk management system 110, security resources can be allocated to individuals with high phishing exposure risk scores in the first score, the second score, or both. Similarly, the security system 190 may be trained to monitor individuals with increased phishing exposure risk scores more closely than those with lower scores. The phishing exposure risk score assessment performed by phishing exposure risk management system 110 also allows enterprise security systems to efficiently allocate resources based on quantifiable trends in the security risk and practices of their employees. The phishing exposure risk score assessment performed by phishing exposure risk management system 110 is advantageous compared to a blanket solution, which may treat every user device 130 and/or account within an enterprise system as having the same risk or as having risk that is divided only by an arbitrarily assigned class or access level, which are not data-driven classifications. Accordingly, phishing exposure risk management system 110, and/or methods performed by phishing exposure risk score risk management system 110 as described herein, improve an enterprise organization's network security system on a personalized, individual basis by providing customized automatic security protocol adaptations even when the only change to the system that may prompt the adaptations is receipt of a suspected phishing email by multiple users within the enterprise organization, and without treating all such recipients in the same blanket fashion.

Figure 2:
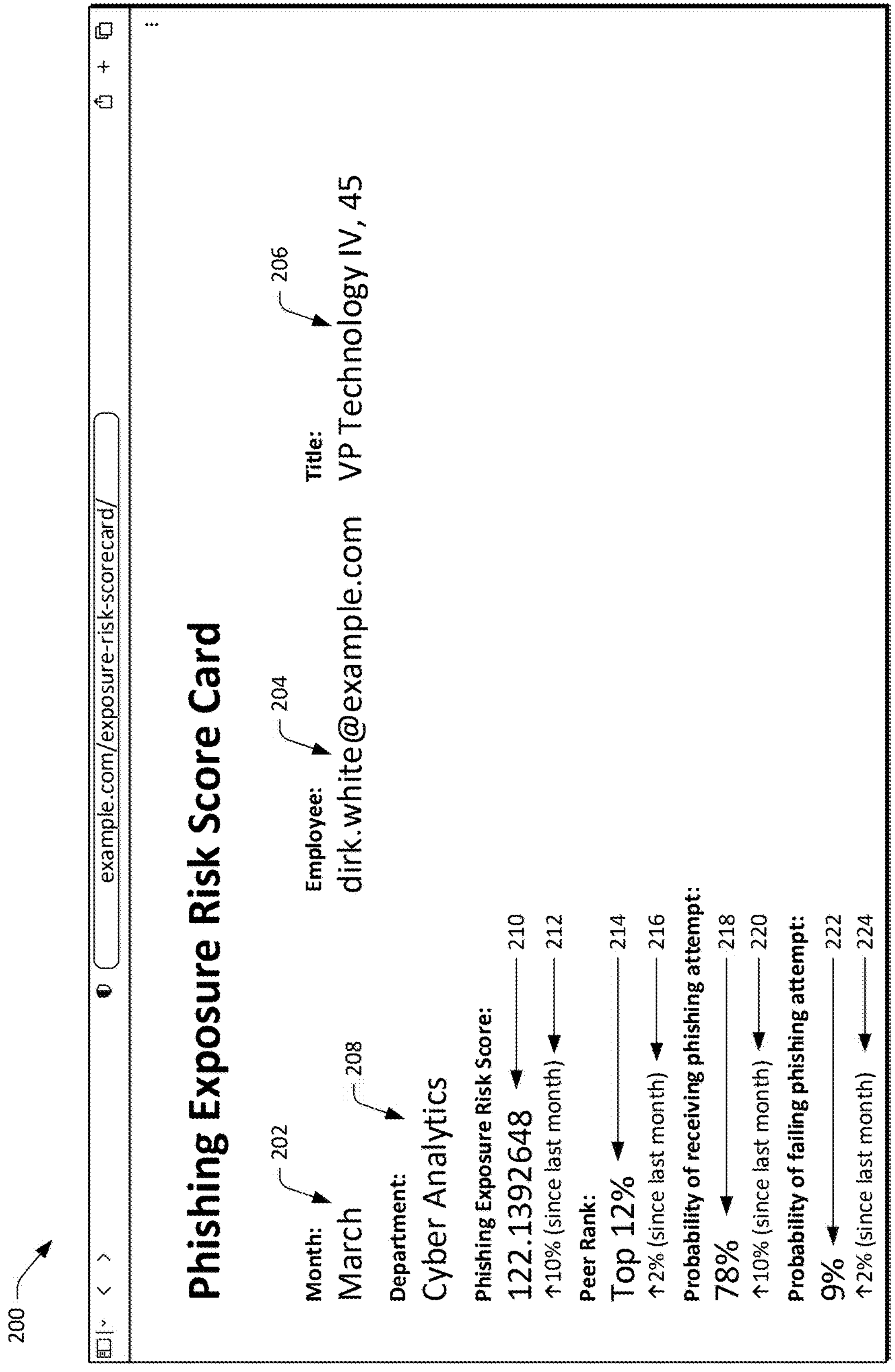
FIG. 2 is a diagram of an example GUI in the form of a web browser window displaying an example phishing exposure risk score card.

FIG. 2 depicts an example GUI 200 as may be generated, at least in part, by visualization generator 118 of FIG. 1 to display a personalized phishing exposure risk score card. In the illustrated example, GUI 200 is a web browser window that displays the personalized score card as a rendered webpage. A web browser may, for example, render the personalized score card by interpreting a markup language, such as hypertext markup language (HTML), as may be modified by a scripting language, such as JavaScript, in accordance with a document object model (DOM). In other examples, not shown, the GUI can be a screen of a mobile device app. In still other examples, not shown, the GUI can be provided as an email message or messaging application instant message. Providing the GUI as a webpage or mobile device app screen may have the advantage of offering real-time updates to the personalized score card as compared to more static rendering methods such as in an email message or messaging application instant message.

In the example score card shown in FIG. 2, a time period (e.g., month) 202 to which the score card pertains is shown. Also in the example score card shown in FIG. 2, a name or other identifier, such as a username or email address 204, of the individual for whom the score card is generated is displayed, along with a job title 206 of the individual and a department 208 of the individual. A phishing exposure risk score 210 is shown. As described above and below, the phishing exposure risk score 210 can be calculated by the phishing exposure risk score generator 114 as a product of weights, or by using a naive Bayes algorithm, or by using one or more trained machine learning models such as one or more generative AI models, as examples. The example personalized phishing exposure risk score card also shows, for the phishing exposure risk score 210, a percentage change 212 over the relevant time period 202 or with respect to an earlier time period. In the illustrated example, the percentage change 212 in the phishing exposure risk score 210 is +10 percent over the previous month for the example individual scored.

A phishing exposure risk score peer rank 214 is also shown in the illustrated example personalized score card of FIG. 2. The phishing exposure risk score peer rank 214 is a percentile that can be calculated by ranking the scored individual's phishing exposure risk score 210 with respect to the phishing exposure risk scores of all other individuals in the enterprise organization and applying an applicable formula. The example personalized phishing exposure risk score card of FIG. 2 also shows, for the phishing exposure risk score peer rank 214, a percentage change 216 over the relevant time period 202 or with respect to an earlier time period. In the illustrated example, the percentage change 216 in the phishing exposure risk score peer rank 214 is +2 percent over the previous month for the example individual scored.

A probability of receiving a phishing attempt 218 is also shown in the illustrated example personalized score card of FIG. 2. The probability of receiving a phishing attempt 218 is the "first score" as described above and below, and can be calculated by the phishing exposure risk score generator 114 as a product of weights, or by using a naive Bayes algorithm, or by using one or more trained machine learning models such as one or more generative AI models, as examples. In the illustrated example, the probability of receiving a phishing attempt 218 is displayed as a percentage. The example personalized phishing exposure risk score card of FIG. 2 also shows, for the probability of receiving a phishing attempt 218, a percentage change 220 over the relevant time period 202 or with respect to an earlier time period. In the illustrated example, the percentage change 220 in the probability of receiving a phishing attempt 218 is +10 percent over the previous month for the example individual scored.

A probability of failing a phishing attempt 222 is also shown in the illustrated example personalized score card of FIG. 2. The probability of failing a phishing attempt 222 is the "second score" as described above and below, and can be calculated by the phishing exposure risk score generator 114 as a product of weights, or by using a naive Bayes algorithm, or by using one or more trained machine learning models such as one or more generative AI models, as examples. In the illustrated example, the probability of failing a phishing attempt 222 is displayed as a percentage. The example personalized phishing exposure risk score card of FIG. 2 also shows, for the probability of failing a phishing attempt 222, a percentage change 224 over the relevant time period 202 or with respect to an earlier time period. In the illustrated example, the percentage change 224 in the probability of failing a phishing attempt 222 is +2 percent over the previous month for the example individual scored.

The illustrated example of FIG. 2 is but one example of a personalized phishing exposure risk score card. Other examples, not illustrated, can display fewer or more of the computed scores or metrics or different scores or metrics, and/or can display the metrics in other ways, such as with charts or graphs showing changes over time of any of the metrics. The charts or graphs, or other elements of the personalized score card, can be made user-interactive through the GUI of the personalized score card. The GUI 200 of FIG. 2 or another GUI for displaying a personalized score card can be displayed, for example, on a user device 130.

Figure 3:
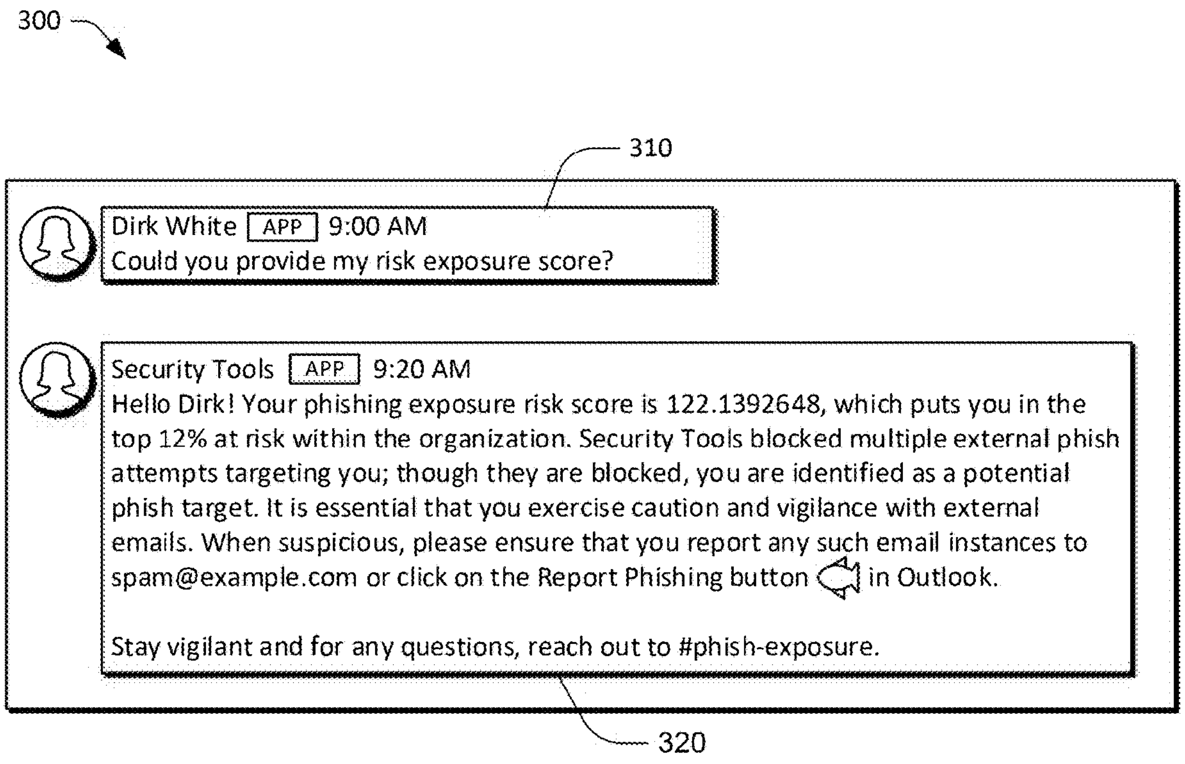
FIG. 3 is a diagram of an example exchange in a messaging application illustrating an example messaging feature of the phishing exposure risk environment of FIG. 1, according to some embodiments.

FIG. 3 depicts an example messaging application interface 300 displaying an example message or inquiry 310 transmitted from user device 130 including a request to receive the personalized phishing exposure risk score for an individual according to some embodiments. The messaging application interface 300 may allow the user device 130 to send inquiries such as example inquiry 310 to phishing exposure risk management system 110 and receive a response, such as example response 320, to an inquiry, such as example inquiry 310. For example, the inquiry may include a request to receive the phishing exposure risk score for an employee of an enterprise organization. Phishing exposure risk management system 110 may transmit a response, such as example response 320, to a user device 130. The response may include the personalized phishing exposure risk score, and/or information detailing metrics that may have contributed to the personalized phishing exposure risk score. The example response 320 provides the personalized phishing exposure risk score of the individual. A response can also indicate a recipient email domain at which the individual received multiple phishing attempts from external sender domains, making it a likely target for future phishing attempts. In some embodiments, the metric (s) identified in the response may be the metric(s) with the highest probabilistic weight during score calculation by phishing exposure risk score generator 114. For example, if the recipient attributes include a high level of privilege access and the security data includes multiple phishing attempts from sender domains, the response may provide the user with both of these contributing metrics. As described above, the response may also include security training information, such as a link to security training, and/or awareness information, and/or a link to view the detailed personalized score card of the individual (such as that shown in FIG. 2) via phishing exposure risk API 116.

In some embodiments, to receive the personalized phishing exposure risk score, a user may have to be authenticated via user device 130. For example, user device 130 may transmit inquiry 310 and provide an identification number associated with the user that is assigned by the enterprise organization, such as the employee contractor number (ECN). Phishing exposure risk management system 110 may authenticate user device 130 before transmitting personalized phishing exposure risk score information. In some embodiments, authentication may be done outside of the messaging application interface, such as through a two-factor authentication service and user device 130.

As described above with reference to phishing exposure risk API 116 and visualization generator 118, a user device 130 may transmit a request 310 to the personalized phishing exposure risk score at any time. An example score transmission is described above with regard to FIG. 3. The messaging application interface 300 shown in FIG. 3 may also be used to transmit notification messages from phishing exposure risk management system 110 to user device(s) 130 when phishing exposure risk scores have been updated or changed. Phishing exposure risk management system 110, via phishing exposure risk API 116 and/or visualization generator 118, may send a generalized notification message to user devices 130 of an enterprise organization indicating the phishing exposure risk scores have been updated. In some embodiments, phishing exposure risk management system 110 may send notification messages in batches to multiple user devices 130 once the personalized phishing exposure risk scores of the individuals have been updated and/or send notification messages as the personalized phishing exposure risk scores are updated. After being authenticated, user device 130 may receive a message similar to response 320 including the personalized phishing exposure risk score and information related to the contributing metrics, security training and awareness, and/or instructions on handling suspected phishing attempts. In some embodiments, response 320 may include a subset of the visual elements used in the GUI, e.g., score card, displayed on user device 130 via phishing exposure risk API 116.

Figure 4:
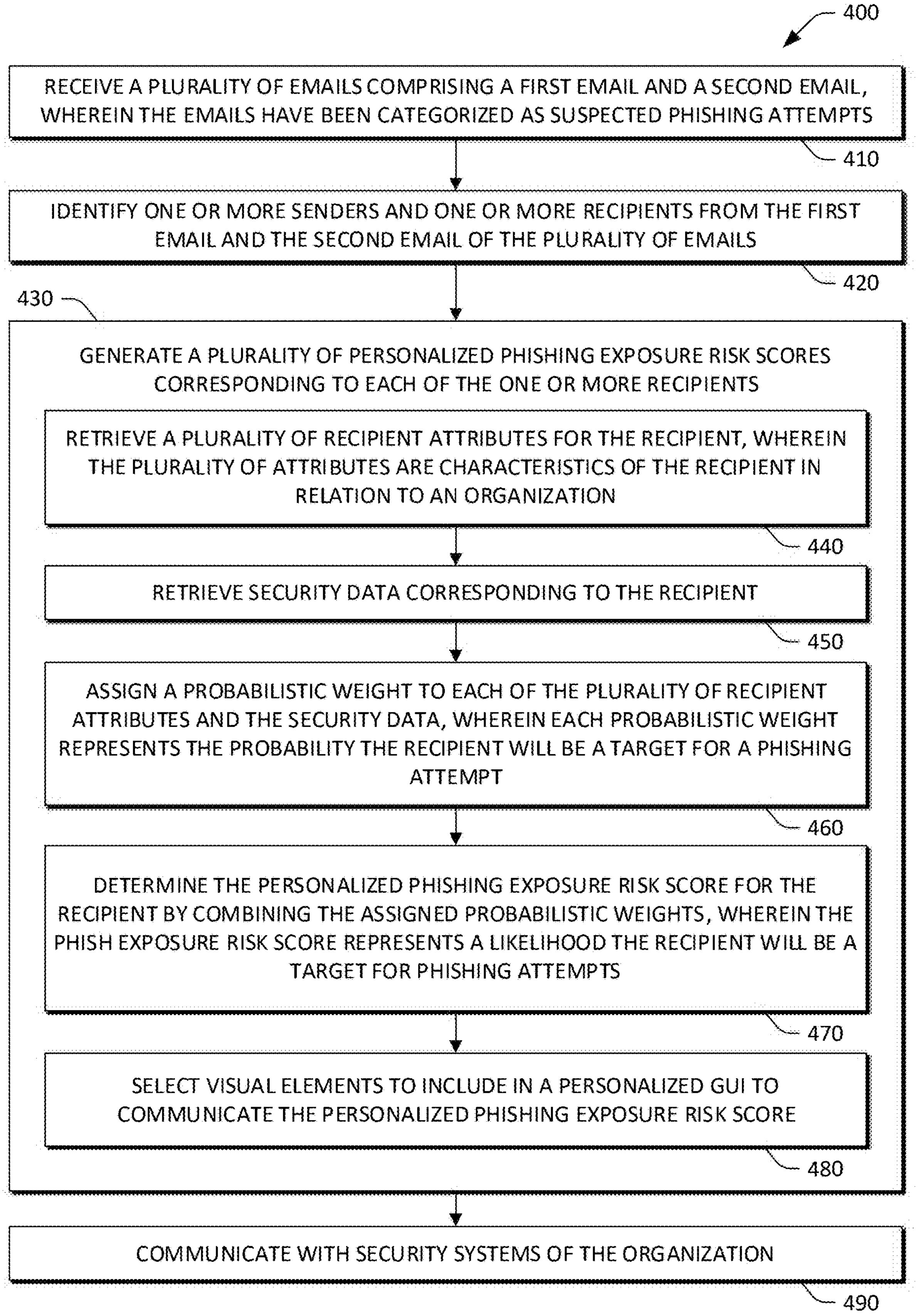
FIG. 4 is a flow diagram illustrating an example method for quantifying a phishing exposure risk score, according to some embodiments.

FIG. 4 is a flow diagram illustrating a method 400 for generating a GUI containing visual elements displaying the personalized phishing exposure risk scores for individuals of an enterprise organization, according to some embodiments. Method 400 is described with reference to FIGS. 1 through 3; however, method 400 is not limited to that example embodiment. In some embodiments, the personalized phishing exposure risk score may include a first score and a second score, with visual elements in the GUI to represent each personalized score. The first score can represent the likelihood the recipient email may be a target of a phishing attempt. The second score can represent the likelihood the individual may fail a phishing attempt, e.g., interact with the email in a way that has the potential to compromise the individual's account or user device 130 of the individual to attackers.

In an embodiment, phishing exposure risk management system 110 may utilize method 400 to generate a personalized phishing exposure risk score for each individual of an enterprise organization. This may allow the enterprise system to be aware of the varying risks of individuals, e.g., employees, within the enterprise organization and automatically efficiently allocate network and cyber security resources. Additionally, the personalized GUI may provide visual elements that explain the personalized phishing exposure risk score, security training and/or resources based on the score, and allow individuals of an enterprise organization to understand their individual risk to the enterprise organization in being targeted by security threats and failing those attacks by compromising the enterprise system. The personalized phishing exposure risk score and personalized GUI improves the use of security resources within the enterprise organization and can proactively address the security risks within the enterprise system prior to a breach or compromising the system to attackers. Method 400 is described with reference to phishing exposure risk management system 110 and may be executed on any computing device, such as, for example, the computer system described with reference to FIG. 7 and/or processing logic that may comprise hardware (e.g., circuitry dedicated logic, programmable logic, microcode, etc.), software (e.g., instructions executing on a processing device), or combination thereof. Additionally, method 400 describes generating a phishing exposure risk score for an individual recipient of a suspected phishing attempt, but method 400 may be automatically performed iteratively for each identified recipient of a suspected phishing email received and categorized by email security evaluation gateway 120. As a result, phishing exposure risk management system 110 may generate a personalized GUI with visual elements displaying the personalized phishing exposure risk score. Additionally, the visual elements may include security resource and training selected based on the personalized phishing exposure risk score, addressing security risks at the individual level within the enterprise organization.

Not all steps may be needed to perform the disclosure provided herein. Further, some of the steps may be performed simultaneously, or in a different order than shown in FIG. 4.

At 410, phishing exposure risk management system 110 may receive a plurality of emails, comprising a first email and a second email, wherein the emails have been categorized as suspected phishing attempts. In some embodiments, each incoming email may be evaluated by email security evaluation gateway 120 to determine whether the email is safe or a suspected phishing email. Phishing exposure risk management system 110 may receive suspected phishing emails periodically from email security evaluation gateway 120. For example, email security evaluation gateway 120 may transmit the plurality of suspected phishing emails at a monthly or weekly cadence. In some embodiments, email security evaluation gateway 120 may transmit the plurality of suspected phishing emails once there are a threshold number of emails. For example, after fifty emails have been categorized as suspected phishing attempts, they may be transmitted to phishing exposure risk management system 110. This allows phishing exposure risk management system 110 to be customized to the requirements of the enterprise organization. Some enterprise organizations may have drastically different numbers of employees and receive different amounts of phishing attempts periodically. Therefore, the enterprise system may adjust the receipt of suspected phishing emails at phishing exposure risk management system 110 based on the computing resources of the phishing exposure risk management system 110.

As described with reference to FIG. 1, email security evaluation gateway 120 may transmit emails categorized as suspected phishing attempts to phishing exposure risk management system 110 to collect metrics regarding the email. In some embodiments, email security evaluation gateway 120 may further categorize suspected phishing emails as blocked or suspicious. Blocked emails may not be forwarded to user device(s) 130, but suspicious email may be forwarded so that phishing exposure risk management system 110 can collect metrics on how the one or more recipients interact with the email. In some embodiments, suspected-suspicious phishing emails may be transmitted with a warning that they have been categorized as suspicious by email security evaluation gateway 120.

At 420, phishing exposure risk management system 110 may identify one or more senders and one or more recipients from the first email of the plurality of emails. In some embodiments, metric extraction service 112 of phishing exposure risk management system 110 may identify the one or more senders and one or more recipients from the first email. Additionally, metric extraction service 112 may repeat this identification process for the second email and each of the emails of the plurality of emails. Metric extraction service 112 may identify the unique sender domains of the plurality of emails and record, based on the security data stored in security database 140 and the plurality of emails received at 410, the number of emails sent from each unique sender domain. Metric extraction service 112 may also identify one or more recipients from the first email. The recipients may be identified based on the use of their respective email addresses associated with the enterprise organization. Metric extraction service 112, via security database 140, can track the number of suspected phishing emails addressed to individual recipients of the enterprise organization.

In some embodiments, metric extraction service 112 may retrieve and store the date of the email. This retrieved and stored date may be used to generate a personalized phishing exposure risk score relative to a specified time frame. Additionally, metric extraction service 112 may analyze the contents of the email identifying common words, phrases, topics, requests, etc. used by attackers attempting phishing attacks. These analyzed common words and phrases may be used in computing the personalized phishing exposure risk score, generating the personalized score card, or more generally in providing security training and awareness of individuals of the enterprise organization. In some embodiments, these metrics may be used to improve security protocols, such as anti-spam and anti-malware filtering, at email security evaluation gateway 120.

At 430, phishing exposure risk management system 110 may generate a plurality of phishing exposure risk scores corresponding to the one or more recipients using the actions 440 through 470. Also at 430, phishing exposure risk management system 110 may generate a plurality of personalized GUIs to communicate the respective personalized phishing exposure risk scores and/or other information related to phishing risks associated with the one or more recipients using action 480. Actions 440 through 480 may, for example, be repeated for each individual of the one or more recipients. The personalized phishing exposure risk score may be unique to each recipient of the email. For example, if the first email is sent to three recipients of an enterprise organization, their personalized phishing exposure risk scores may all be different, even though they were recipients of the same email. That is because the sender domain and receipt of an email can be only a few metrics of many that may contribute to the personalized phishing exposure risk score of the individual. As described below, the personalized phishing exposure risk score can take into account metrics relating to recipient attributes of the enterprise organization (e.g., job title, band, hire date, privilege access, etc.) and past security data of simulated and real-world phishing attempts. An individual's personalized phishing exposure risk score may also include two separate scores, a first score representing the likelihood the individual will be a target for phishing attempts, and a second score representing the likelihood the individual will fail a phishing attempt if targeted.

At 440, phishing exposure risk management system 110 may retrieve a plurality of recipient attributes, where the plurality of recipient attributes are characteristics of the recipient in relation to the enterprise organization, according to some embodiments. Once metric extraction service 112 has identified 420 the one or more recipients of the email, metric extraction service 112 may then retrieve 440 a plurality of recipient attributes. The recipient attributes may be the position or job title of the recipient, a band or level of the recipient within the enterprise organization, the recipient's hire date, the recipient's access to privileged, sensitive, and/or compartmentalized information, or similar attributes that may make the recipient a desirable target for phishing attempts.

Metric extraction service 112 may, for example, retrieve 440 the recipient attributes form security database 140. In some embodiments, metric extraction service 112 may retrieve 440 the recipient attributes from other databases of the enterprise organization that may house personal information of the employees of the enterprise organization. Metric extraction service 112 may also include web-crawling components that retrieve 440 public information of the recipient in relation to the enterprise organization, such as external webpages of the enterprise organization or social networking sites. Metric extraction service 112 may store the information in security database 112 for future use in updating the personalized phishing exposure risk score of the individual.

At 450, phishing exposure risk management system 110 may retrieve security data corresponding to the recipient, according to some embodiments. Metric extraction service 112 may retrieve the security data related to the recipient from security database 140. Security database 140 may store two types of security data. One type of security data can be related to real-world phishing attempts, breaches, and/or compromises. Another type of security data can be related to internal phishing simulations. Data from both of these situations may be useful in generating phishing exposure risk score to predict the likelihood an individual be targeting by phishing attackers and the likelihood they will fail a phishing attempt. For example, security data related to real-world phishing attempts may be important to determining the first score, e.g., if an individual has already been a part of a breach or attempted breach, then that individual may be more likely to be targeted in the future. In practice, security data related to internal phishing simulations may not represent a large contributing factoring the first score, but may be weighted more in determining the second score related to failing a phishing attempt. For example, an individual who consistently fails simulated phishing attempts may have a larger risk of failing a real-world phishing attempt, regardless of that individual's likelihood of being targeted.

At 440 and 450, metric extraction service 112 may extract all relevant metrics. However, for score calculation at 460 and 470, phishing exposure risk score generator 114 may use a subset of the collected metrics that are relevant to the likelihood of being targeted or failing a phishing attempt.

At 460, phishing exposure risk management system 110 may assign a respective probabilistic weight to each of the metrics, according to some embodiments. The metrics may be the recipient attributes and/or security data retrieved by metric extraction service 112. The probabilistic weight may represent the probability the recipient will be a target for a phishing attempt with respect to the first score and a probability the recipient will fail a phishing attempt with respect to the second score. As described above, not every metric may be relevant to both scores. Phishing exposure risk score generator 114 may identify the relevant metrics for the first score and the second score and assign a weight to the metrics.

For example, when assigning weights to metrics for the first score, recipient attributes may receive much higher weights than if they are used to for the second score. The characteristics of an individual related to the enterprise organization may have a much greater impact on bring a target for phishing attempts than the individual's likelihood to fail a phishing attempt. Similarly, past simulation behavior may be given little to no weight in the first score but a large weight in the second score. Phishing exposure risk score generator 114 may assign weights based on the relevance of the metric in calculating the first score and the second score of the phishing exposure risk score and/or the method, algorithm, etc., being used to determine the personalized phishing exposure risk score.

In some embodiments, the accuracy of the personalized phishing exposure risk score may be tested and used to train phishing exposure risk score generator 114. For example, an individual's score may identify a low likelihood of being targeted by phishing attackers, but in practice, the individual may receive more phishing attempts than expected. This data may be used to train phishing exposure risk score generator 114 so that the accuracy of the generated personalized phishing exposure risk scores improve over time.

At 470, phishing exposure risk management system 110 determines the personalized phishing exposure risk score of the recipient by combining the assigned probabilistic weights, according to some embodiments. Phishing exposure risk score generator 114 may allow each assigned weight to be independent and multiply each of the individual assigned weights to determine the phishing exposure risk score of the recipient. In some embodiments, phishing exposure risk score generator 114 may use separate metrics and assigned weights for the first score and the second score of the personalized phishing exposure risk score. In some embodiments, phishing exposure risk score generator 114 may utilize more sophisticated algorithms to determine the first score and/or the second score. For example, the second score may be determined using a naive Bayes algorithm. Additionally, phishing exposure risk score generator 114 may use one or more machine learning models, such as one or more generative AI models, to generate the personalized phishing exposure risk score of the individuals of an enterprise organization.

At 480, phishing exposure risk management system 110 may select visual elements to include in the personalized GUI to communicate the personalized phishing exposure risk score, according to some embodiments. The personalized GUI, e.g., personalized score card, can be generated and sent to recipients as described with reference to FIG. 5. Visualization generator 118 may identify and generate visual elements to include in the personalized GUI. For example, the personalized phishing exposure risk score may be represented as visual elements that can be updated when the first score and the second score are first generated and/or subsequently updated. Additionally, visualization generator 118 may generate visual elements for security training and resources. This may include digital content included in the personalized GUI, e.g., training videos, infographics, and similar training materials, as well as links to download in-depth training resource or re-direct the user to other security resources. In some embodiments, visualization generator 118 may generate visual elements to provide comparison of the personalized phishing exposure risk score of the individual with phishing exposure risk scores of other individuals of the enterprise organization. For example, charts, graphs, and other data comparison graphics, that allow visualization generator 118 to visually depict comparisons.

At 490, phishing exposure risk management system 110 may communicate with a security system 190 of the enterprise organization, according to some embodiments. For example, as at least part of this communication 490, phishing exposure risk management system 110 may transmit the personalized phishing exposure risk scores of the individuals of an enterprise organization to the security system 190 of the enterprise organization. The phishing exposure risk management system 110 or the security system 190 may apply security protocols to individuals of an enterprise organization on an individual level, based on their respective personalized phishing exposure risk scores. For example, an individual may have a high phishing exposure risk score indicating the individual's email is a likely target of phishing attempts. Phishing exposure risk management system 110 may send the score to the security system 190 of the enterprise organization and the system. As a result, the phishing exposure risk management system 110 or the security system 190 may apply increased security protocols to the account of the individual based on the individual's high personalized phishing exposure risk score. In another example, someone may have a low first score of the personalized phishing exposure risk score, indicating the email is not likely to be a target of a phishing attempt, but a high second score, indicating the individual is likely to fail a phishing attempt if targeted. Phishing exposure risk management system 110 may send both the first score (target likelihood score) and the second score (failure likelihood score) of the phishing exposure risk score to the security system 190 of the enterprise organization. The phishing exposure risk management system 110 or the security system 190 may automatically apply security protocols based on the individual phishing exposure risk score, including the first (target likelihood) and second (failure likelihood) scores. In the example described, the security system 190 may automatically apply stricter security protocols to the accounts and/or user device 130 of the individual. Even if the individual's first score is low, the phishing exposure risk management system 110 or the security system 190 may allocate these resources based on the second score being high because, in the event of being targeted, the likelihood of failure is high.

Figure 5:
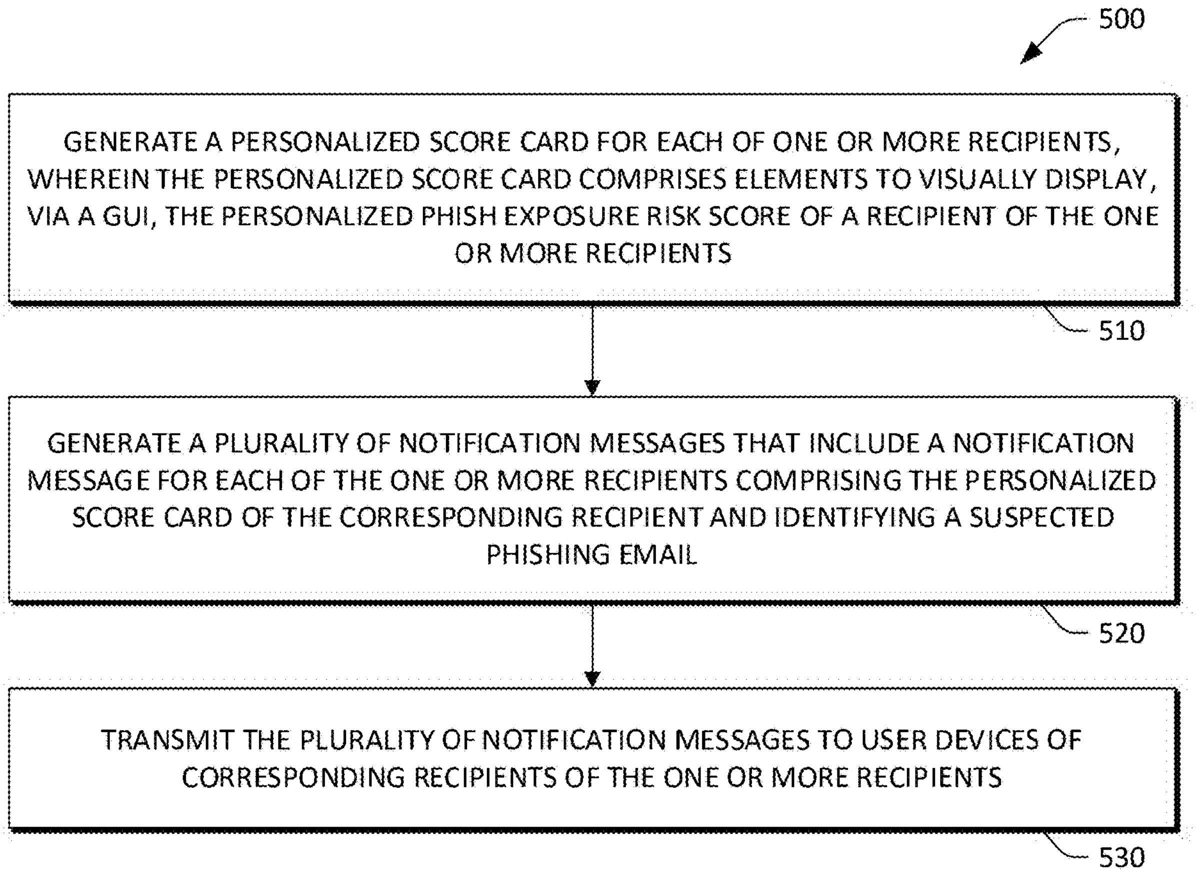
FIG. 5 is a flow diagram illustrating an example method for generating and communicating a personalized score card to an individual of an enterprise organization, according to some embodiments.

FIG. 5 is flow diagram illustrating a method 500 for generating and communicating a personalized score card to the individuals of an enterprise organization, according to some embodiments. Method 500 is described with reference to FIGS. 1 through 4; however, method 500 is not limited to that example embodiment. In some embodiments, the personalized score card may further include the personalized phishing exposure risk score, both the first and second scores, real-world examples of the recipient's interaction with phishing attempts, and/or security training and resources.

In an embodiment, phishing exposure risk management system 110 may utilize method 500 to generate a personalized score card for each individual of an enterprise organization. The personalized score card may allow individuals of an enterprise organization to understand their respective individual risks to the enterprise organization in being targeted by security threats and failing those attacks by compromising the enterprise system. This may allow individuals to improve their use of security resources and proactively understand their roles in security of the enterprise system prior to a breach or compromising the system to attackers. Method 500 is described with reference to phishing exposure risk management system 110 and may be executed on any computing device, such as, for example, the computer system described with reference to FIG. 7 and/or processing logic that may comprise hardware (e.g., circuitry dedicated logic, programmable logic, microcode, etc.), software (e.g., instructions executing on a processing device), or combination thereof. Additionally, method 500 describes generating a personalized score card for an individuals who are the recipients of a suspected phishing attempt, but method 500 may be automatically performed iteratively for each identified recipient of each suspected phishing email received and categorized by email security evaluation gateway 120. This may allow phishing exposure risk management system 110 to efficiently generate personalized phishing exposure risk scores for individuals of an enterprise organization, increasing the speed of responding to security threats to the enterprise system.

In some examples, method 500 may be preceded by determining, based on security data of a recipient, the likelihood the recipient will fail a phishing attack, wherein failing a phishing attack comprises interacting with a phishing email such that compromising data is provided to the sender of the phishing attack. Not all actions of method 500 may be needed to perform some embodiments described herein. Further, some of the steps may be performed simultaneously, or in a different order than shown in FIG. 5.

At 510, phishing exposure risk management system 110 may generate a personalized score card of each recipient of a suspected phishing email, including the visual elements generated as described with reference to FIG. 4. In some embodiments, the personalized score card may include the phishing exposure risk score of the individual, e.g., recipient of the suspected phishing email. Visualization generator 118 may generate the score card to be displayed using a GUI via phishing exposure risk API 116 on user device 130. The personalized score card may display detailed information regarding the phishing exposure risk score of the individual via personalized visual elements generated by visualization generator 118 based on the personalized phishing exposure risk score of the individual, including both the first score and the second score. For example, the personalized score card may include visual elements displaying metrics that contributed most significantly to the phishing exposure risk score for the first score and/or the second score. In some embodiments, the personalized score card may include a visual element displaying a peer ranking that allows the individual recipient to compare the individual recipient's scores and metrics with those of the individual recipient's peers in the enterprise organization.

At 520, phishing exposure risk management system 110 may generate a plurality of notification messages that include a notification message for each of the one or more recipients comprising the personalized score card of the corresponding recipient and identifying the suspected phishing email, according to some embodiments. Visualization generator 118 may generate a message each time the personalized phishing exposure risk score, and therefore personalized score card, of an individual is updated or newly generated. The message may have a link or image of the suspected phishing email so that the individual can be notified regarding the relationship between any change in the individual's phishing exposure risk score and the suspected phishing email.

In some embodiments, the message generated may include the personalized phishing exposure risk score of the individual and a brief or "quick view" of the score card. This may limit the amount of personal information that is transmitted via the messaging application interface by visualization generator 118. The messaging application may be a third party service, while phishing exposure risk API 116 may allow the GUI displaying the detailed score card of the individual to be hosted by an internal server.

At 530, phishing exposure risk management system 110 may transmit the plurality of notification messages to the corresponding recipients, according to some embodiments. As described with reference to FIG. 1, the first message generated may be a general notification message to let the individual know the individual's personalized phishing exposure risk score has been generated. The individual may then have to be authenticated before the more detailed message may be transmitted by visualization generator 118 to the individual. This may increase security regarding the phishing exposure risk score and sensitive information used for metrics in determining the first score and the second score.

The message generated and transmitted to user device(s) 130 by visualization generator 118 may contain a link to the GUI of phishing exposure risk API 116 that can provide the full personalized score card. The individual may be able to interact with the GUI of phishing exposure risk API 116 displaying the score card to obtain detailed information about the individual's phishing exposure risk score. For example, the individual may filter peers by different recipient attributes, first scores, second scores, or other metrics used in generating the phishing exposure risk score of the individual.

Figure 6:
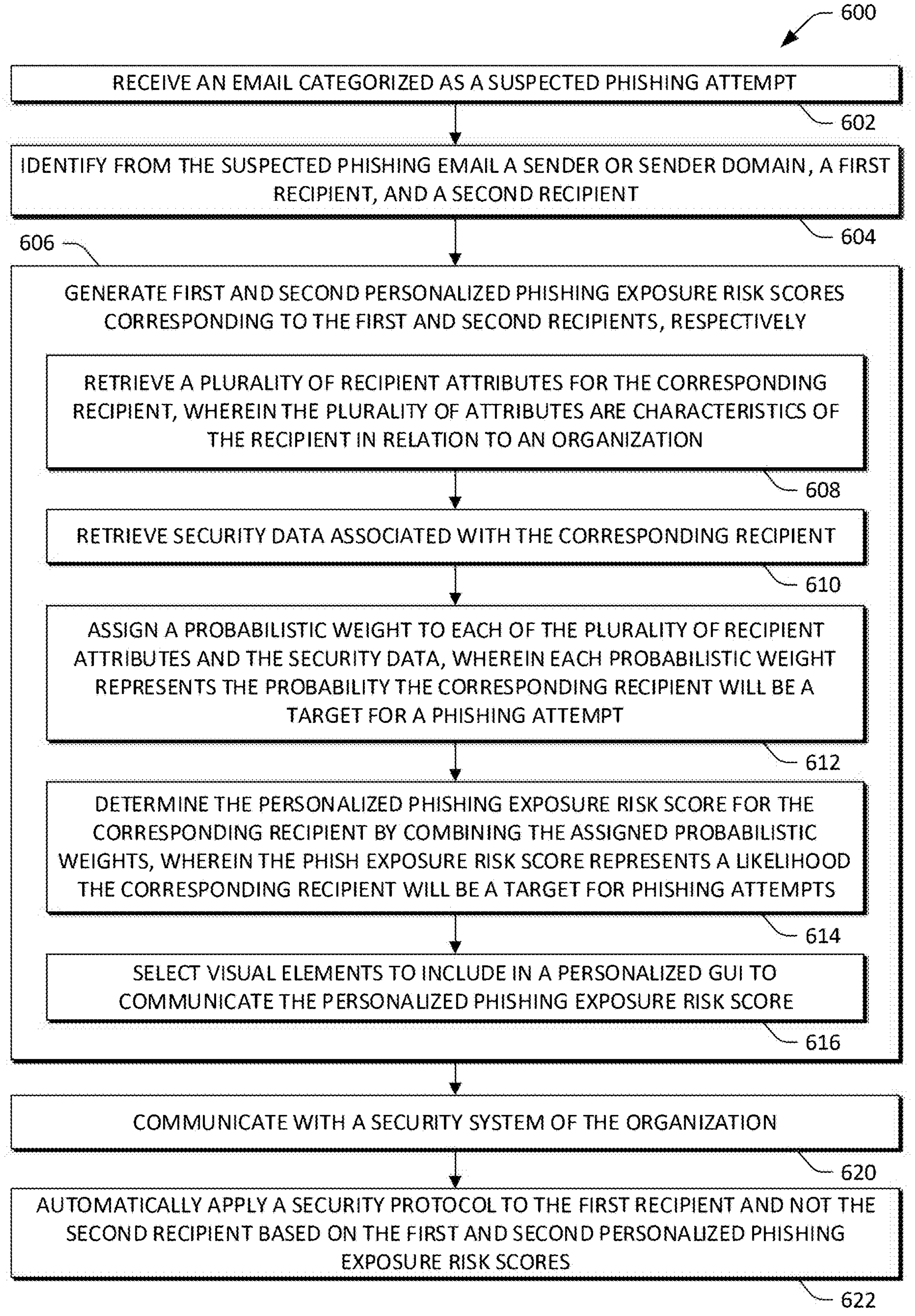
FIG. 6 is a flow diagram illustrating an example method for generating and communicating personalized score cards to individuals of an enterprise organization, according to some embodiments.

FIG. 6 is a flow diagram illustrating a method 600 for generating personalized GUIs containing visual elements displaying the personalized phishing exposure risk scores for first and second individuals of an enterprise organization, according to some embodiments. Method 600 is described with reference to FIGS. 1 through 3; however, method 600 is not limited to that example embodiment. In some embodiments, the personalized phishing exposure risk score for each individual may include a first score and a second score, with visual elements in the GUI to represent each personalized score. The first score can represent the likelihood the recipient email may be a target of a phishing attempt. The second score can represent the likelihood the individual may fail a phishing attempt, e.g., interact with the email in a way that has the potential to compromise the individual's account or user device 130 of the individual to attackers.

In an embodiment, phishing exposure risk management system 110 may utilize method 600 to generate a personalized phishing exposure risk score for first and second individuals of an enterprise organization. This may allow the enterprise system to be aware of the varying phishing risks associated with the first and second individuals, e.g., employees, within the enterprise organization and automatically efficiently allocate network and cyber security resources. Additionally, the personalized GUIs may provide visual elements that explain the personalized phishing exposure risk score, security training and/or resources based on the score, and allow individuals of an enterprise organization to understand their individual risk to the enterprise organization in being targeted by security threats and failing those attacks by compromising the enterprise system. The personalized phishing exposure risk score and personalized GUI improves the use of security resources within the enterprise organization and can proactively address the security risks within the enterprise system prior to a breach or compromising the system to attackers. Method 600 is described with reference to phishing exposure risk management system 110 and may be executed on any computing device, such as, for example, the computer system described with reference to FIG. 7 and/or processing logic that may comprise hardware (e.g., circuitry dedicated logic, programmable logic, microcode, etc.), software (e.g., instructions executing on a processing device), or combination thereof. Additionally, method 600 describes generating a phishing exposure risk score for an individual recipient of a suspected phishing attempt, but method 600 may be automatically performed iteratively for each identified recipient of a suspected phishing email received and categorized by email security evaluation gateway 120. As a result, phishing exposure risk management system 110 may generate a personalized GUI with visual elements displaying the personalized phishing exposure risk score. Additionally, the visual elements may include security resource and training selected based on the personalized phishing exposure risk score, addressing security risks at the individual level within the enterprise organization.

Not all steps may be needed to perform the disclosure provided herein. Further, some of the steps may be performed simultaneously, or in a different order than shown in FIG. 6.

At 602, phishing exposure risk management system 110 may receive an email categorized as a suspected phishing attempt. In some embodiments, the incoming email may be evaluated by email security evaluation gateway 120 to determine whether the email is safe or a suspected phishing email. Phishing exposure risk management system 110 may receive suspected phishing emails periodically from email security evaluation gateway 120. For example, email security evaluation gateway 120 may transmit suspected phishing emails at a monthly or weekly cadence. In some embodiments, email security evaluation gateway 120 may transmit suspected phishing emails once there are a threshold number of emails. For example, after fifty emails have been categorized as suspected phishing attempts, they may be transmitted to phishing exposure risk management system 110. This allows phishing exposure risk management system 110 to be customized to the requirements of the enterprise organization. Some enterprise organizations may have drastically different numbers of employees and receive different amounts of phishing attempts periodically. Therefore, the enterprise system may adjust the receipt of suspected phishing emails at phishing exposure risk management system 110 based on the computing resources of the phishing exposure risk management system 110.

As described with reference to FIG. 1, email security evaluation gateway 120 may transmit emails categorized as suspected phishing attempts to phishing exposure risk management system 110 to collect metrics regarding the email. In some embodiments, email security evaluation gateway 120 may further categorize suspected phishing emails as blocked or suspicious. Blocked emails may not be forwarded to user device(s) 130, but suspicious email may be forwarded so that phishing exposure risk management system 110 can collect metrics on how the one or more recipients interact with the email. In some embodiments, suspected-suspicious phishing emails may be transmitted with a warning that they have been categorized as suspicious by email security evaluation gateway 120.

At 604, phishing exposure risk management system 110 may identify from the suspected phishing email a sender or sender domain, a first recipient, and a second recipient. In some embodiments, metric extraction service 112 of phishing exposure risk management system 110 may identify the sender or sender domain and the one or more recipients from the suspected phishing email. Metric extraction service 112 may also repeat this identification process for additional suspected phishing emails. For example, metric extraction service 112 may identify a unique sender domain of the suspected phishing email and record, based on the security data stored in security database 140 and the suspected phishing email received at 602, the number of emails sent from each unique sender domain. Metric extraction service 112 may also identify the first and second recipients from the suspected phishing email. The recipients may be identified based on the use of their respective email addresses associated with the enterprise organization. Metric extraction service 112, via security database 140, can track the number of suspected phishing emails addressed to individual recipients of the enterprise organization.

For the purposes of method 600, the suspected phishing email need not be a single email message addressed to both of the two (or more) recipients including the first and second recipient; rather, the suspected phishing email can, in some examples, comprise two or more separate messages, e.g., separately addressed to the first and second recipients (and/or to additional recipients), but for which the content of the email messages is determined (e.g., by email security evaluation gateway 120 or metric extraction service 112 of phishing exposure risk management system 110) to be identical, substantially identical, or highly similar. As one example, two email messages that differ only by recipient(s) and, possibly, send time, but which otherwise have identical subject and body content, can be considered identical, and thus one suspected phishing email for the purposes of method 600. As another example, two separate email messages addressed to different recipients within the enterprise organization can be determined to be substantially identical, and thus one suspected phishing email for the purposes of method 600, if the subject and body content of the two separate email messages is similar (e.g., differs only by an identifying code, such as a hyperlink address or an identifying code in a hyperlink). As yet another example, two separate email messages addressed to different recipients within the enterprise organization can be determined to be substantially identical, and thus one suspected phishing email for the purposes of method 600, if the subject and body content of the two separate email messages is identical or similar and the sender or sender domains differs. As still another example, two separate email messages addressed to different recipients within the enterprise organization can be determined to be highly similar, and thus one suspected phishing email for the purposes of method 600, if the content of the two separate email messages differs but other information pertaining to the email, such as sender, sender domain, or send time, suggests that the two separate emails are both of a similar nature as phishing attempts from the same attacker or group of attackers. For example, if a first recipient in an enterprise organization is addressed a first phishing email advising that the first recipient has won a prize or received an award and may follow a first hyperlink to claim the prize or award, and a second recipient in an enterprise organization is addressed a second phishing email advising that the second recipient has suffered a security breach and should follow a second hyperlink to address the security breach, but sender, sender domain, and/or send times of the first and second phishing emails otherwise suggest that they are part of the same attack (e.g., sender domains match and the emails are sent only seconds or minutes apart), then the first and second phishing emails can be determined to be highly similar and can thus be together considered one suspected phishing email for the purposes of method 600. By contrast, in some examples, two messages sent at different times exceeding a send time difference threshold, or two messages having different subject and body content and sent from different senders or different sender domains, can be determined not to be identical, substantially identical, or highly similar, and thus not a single email message for the purposes of method 600.

In some embodiments, metric extraction service 112 may retrieve and store the date of the suspected phishing email received at 602. This retrieved and stored date may be used to generate a personalized phishing exposure risk score relative to a specified time frame. Additionally, metric extraction service 112 may analyze the contents of the suspected phishing email identifying common words, phrases, topics, requests, etc. used by attackers attempting phishing attacks. These analyzed common words and phrases may be used in computing the personalized phishing exposure risk score, generating the personalized score card, or more generally in providing security training and awareness of individuals of the enterprise organization. In some embodiments, these metrics may be used to improve security protocols, such as anti-spam and anti-malware filtering, at email security evaluation gateway 120.

At 606, phishing exposure risk management system 110 may generate first and second phishing exposure risk scores corresponding to the first recipient and the second recipient using the actions 608 through 616 for each of the first and second recipients. Also at 606, phishing exposure risk management system 110 may generate first and second personalized GUIs to communicate the respective personalized phishing exposure risk scores and/or other information related to phishing risks associated with the one or more recipients using action 620. Actions 608 through 61 are repeated for each of the first and second recipients in method 600 and may, in some examples, be repeated for additional recipients in methods that extend from method 600. The first and second personalized phishing exposure risk scores are, in the example of method 600, unique to each of the first and second recipients. That is, the first personalized phishing exposure risk score differs from the second personalized phishing exposure risk score. This is because, in example method 600, although the suspected phishing email is sent to both of the first and second recipients of the enterprise organization, the respective first and second personalized phishing exposure risk scores are different based on other recipient attributes and/or security data that factors in to the computation of the respective first and second personalized phishing exposure risk scores differently for each of the first and second recipients, even though the first and second recipients were both recipients of the same email (e.g., separately addressed identical, substantially identical, or highly similar phishing emails). As noted above, the sender domain and receipt of an email can be only a few metrics of many that may contribute to the personalized phishing exposure risk score of a given individual. As described above and below, the personalized phishing exposure risk score can take into account metrics relating to recipient attributes of the enterprise organization (e.g., job title, band, hire date, privilege access, etc.) and past security data of simulated and real-world phishing attempts. An individual's personalized phishing exposure risk score may also include two separate scores, a first score representing the likelihood the individual will be a target for phishing attempts, and a second score representing the likelihood the individual will fail a phishing attempt if targeted.

At 608, phishing exposure risk management system 110 may retrieve a plurality of recipient attributes, where the plurality of recipient attributes are characteristics of the corresponding recipient in relation to the enterprise organization, according to some embodiments. Once metric extraction service 112 has identified 604 the one or more recipients of the suspected phishing email, metric extraction service 112 may then retrieve 608 a plurality of recipient attributes. The recipient attributes may be the position or job title of the recipient, a band or level of the recipient within the enterprise organization, the recipient's hire date, the recipient's access to privileged, sensitive, and/or compartmentalized information, or similar attributes that may make the recipient a desirable target for phishing attempts.

Metric extraction service 112 may, for example, retrieve 608 the recipient attributes form security database 140. In some embodiments, metric extraction service 112 may retrieve 608 the recipient attributes from other databases of the enterprise organization that may house personal information of the employees of the enterprise organization. Metric extraction service 112 may also include web-crawling components that retrieve 608 public information of the recipient in relation to the enterprise organization, such as external webpages of the enterprise organization or social networking sites. Metric extraction service 112 may store the information in security database 112 for future use in updating the personalized phishing exposure risk score of the individual.

At 610, phishing exposure risk management system 110 may retrieve security data associated with the corresponding recipient, according to some embodiments. Metric extraction service 112 may retrieve the security data related to the recipient from security database 140. Security database 140 may store two types of security data. One type of security data can be related to real-world phishing attempts, breaches, and/or compromises. Another type of security data can be related to internal phishing simulations. Data from both of these situations may be useful in generating phishing exposure risk score to predict the likelihood an individual be targeting by phishing attackers and the likelihood they will fail a phishing attempt. For example, security data related to real-world phishing attempts may be important to determining the first score (target likelihood score), e.g., if an individual has already been a part of a breach or attempted breach, then that individual may be more likely to be targeted in the future. In practice, security data related to internal phishing simulations may not represent a large contributing factoring the first score (target likelihood score), but may be weighted more in determining the second score (failure likelihood score) that is related to failing a phishing attempt. For example, an individual who consistently fails simulated phishing attempts may have a larger risk of failing a real-world phishing attempt, regardless of that individual's likelihood of being targeted.

At 608 and 610, metric extraction service 112 may extract all relevant metrics. However, for score calculation at 612 and 614, phishing exposure risk score generator 114 may use a subset of the collected metrics that are relevant to the likelihood of being targeted or failing a phishing attempt.

At 612, phishing exposure risk management system 110 may assign a respective probabilistic weight to each of the metrics, according to some embodiments. The metrics may be the recipient attributes and/or security data retrieved by metric extraction service 112. The probabilistic weight may represent the probability the corresponding recipient will be a target for a phishing attempt with respect to the first score (target likelihood score) and a probability the corresponding recipient will fail a phishing attempt with respect to the second score (failure likelihood score). As described above, one or more of the metrics may be relevant to one of the first (target likelihood) or second (failure likelihood) scores but not to the other of the scores. Phishing exposure risk score generator 114 may identify the relevant metrics for the first score (target likelihood score) and the second score (failure likelihood score) and assign a weight to the metrics.

For example, when assigning weights to metrics for the first score (target likelihood score), recipient attributes may receive much higher weights than if they are used to for the second score (failure likelihood score). The characteristics of an individual related to the enterprise organization may have a much greater impact on bring a target for phishing attempts than the individual's likelihood to fail a phishing attempt. Similarly, past simulation behavior may be given little to no weight in the first score (target likelihood score) but a large weight in the second score (failure likelihood score). Phishing exposure risk score generator 114 may assign weights based on the relevance of the metric in calculating the first score (target likelihood score) and the second score (failure likelihood score) of the phishing exposure risk score and/or the method, algorithm, etc., being used to determine the personalized phishing exposure risk score.

In some embodiments, the accuracy of the personalized phishing exposure risk score may be tested and used to train phishing exposure risk score generator 114. For example, an individual's score may identify a low likelihood of being targeted by phishing attackers, but in practice, the individual may receive more phishing attempts than expected. This data may be used to train phishing exposure risk score generator 114 so that the accuracy of the generated personalized phishing exposure risk scores improve over time.

At 614, phishing exposure risk management system 110 determines the personalized phishing exposure risk score of the recipient by combining the assigned probabilistic weights, according to some embodiments. Phishing exposure risk score generator 114 may allow each assigned weight to be independent and multiply each of the individual assigned weights to determine the phishing exposure risk score of the recipient. In some embodiments, phishing exposure risk score generator 114 may use separate metrics and assigned weights for the first score and the second score of the personalized phishing exposure risk score. In some embodiments, phishing exposure risk score generator 114 may utilize more sophisticated algorithms to determine the first score and/or the second score. For example, the second score may be determined using a naive Bayes algorithm. Additionally, phishing exposure risk score generator 114 may use one or more machine learning models, such as one or more generative AI models, to generate the personalized phishing exposure risk score of the individuals of an enterprise organization.

At 616, phishing exposure risk management system 110 may select visual elements to include in the personalized GUI to communicate the personalized phishing exposure risk score to the corresponding recipient, according to some embodiments. The personalized GUI, e.g., personalized score card, can, for example, be generated and sent to the corresponding recipient of the first and second recipients as described with reference to FIG. 5. Visualization generator 118 may identify and generate visual elements to include in the personalized GUI. For example, the personalized phishing exposure risk score may be represented as visual elements that can be updated when the first score and the second score are first generated and/or subsequently updated. Additionally, visualization generator 118 may generate visual elements for security training and resources. This may include digital content included in the personalized GUI, e.g., training videos, infographics, and similar training materials, as well as links to download in-depth training resource or re-direct the user to other security resources. In some embodiments, visualization generator 118 may generate visual elements to provide comparison of the personalized phishing exposure risk score of the individual with phishing exposure risk scores of other individuals of the enterprise organization. For example, charts, graphs, and other data comparison graphics, that allow visualization generator 118 to visually depict comparisons.

Although not shown in FIG. 6, in some embodiments, phishing exposure risk management system 110 may generate a first notification message for the first recipient and a second notification message for the second recipient, each of the first and second notification messages respectively comprising the personalized score card of the corresponding first or second recipient and identifying the suspected phishing email. In some embodiments, phishing exposure risk management system 110 may transmit the first and second notification messages to the respective first and second recipients.

At 620, phishing exposure risk management system 110 may communicate with a security system 190 of the enterprise organization, according to some embodiments. For example, as at least part of this communication 620, phishing exposure risk management system 110 may transmit the personalized phishing exposure risk scores of the individuals of an enterprise organization to the network security system 190 of the enterprise organization. Phishing exposure risk management system 110, or the network security system 190 with which the phishing exposure risk management system 110 is in communication, may automatically apply security protocols to individuals of an enterprise organization on an individual level, based on their respective personalized phishing exposure risk scores. For example, phishing exposure risk management system 110, or the network security system 190 with which the phishing exposure risk management system 110 is in communication, may automatically apply 622 a security protocol to the first recipient and not the second recipient based on the first and second personalized phishing exposure risk scores. The automatic application of a security protocol can include, as examples, allocation of a network resource or limiting of an access privilege.

As one example of automatically applying a security protocol, an individual may have a high phishing exposure risk score indicating the individual's email is a likely target of phishing attempts. Phishing exposure risk management system 110 may send the score to the network security system 190 of the enterprise organization. As a result, the phishing exposure risk management system 110 or the security system 190 may automatically apply increased security protocols to the account of the individual based on the individual's high personalized phishing exposure risk score. The phishing exposure risk management system 110 and/or the security system 190 may treat the first and second recipients of the suspected phishing email differently based on their different personalized phishing exposure risk scores, despite the fact that both the first and second recipients received the same suspected phishing email. As one example, the phishing exposure risk management system 110 or the security system 190 may automatically allocate a network resource to the first recipient and not the second recipient based on the first and second personalized phishing exposure risk scores, e.g., based on the first personalized phishing exposure risk score exceeding a threshold or falling into a threshold percentile and the second personalized phishing exposure risk score not exceeding the threshold or not falling into the threshold percentile. As another example, the phishing exposure risk management system 110 or the security system 190 may automatically limit an access privilege of the first recipient and not the second recipient based on the first and second personalized phishing exposure risk scores.

As another example of automatically applying a security protocol, one of the first recipient or the second recipient may have a low first score (target likelihood score) of the personalized phishing exposure risk score, indicating the email is not likely to be a target of a phishing attempt, but a high second score (failure likelihood score), indicating the individual is likely to fail a phishing attempt if targeted. Phishing exposure risk management system 110 may send both the first score (target likelihood score) and the second score (failure likelihood score) of the phishing exposure risk score to the security system 190 of the enterprise organization. The security system 190 may apply security protocols based on the individual phishing exposure risk score, including the first and second score. In the example described, the security system 190 may apply stricter security protocols to the accounts and/or user device 130 of the individual. Even if the individual's first score is low, the security system 190 may allocate these resources based on the second score being high because, in the event of being targeted, the likelihood of failure is high.

As still another example of automatically applying a security protocol, the phishing exposure risk management system 110 or the security system 190 may observe a reduction in a personalized phishing exposure risk score or one or both of the target likelihood score or the failure likelihood score for an individual recipient relative to a previous score and adjust a security protocol for the individual recipient accordingly. As examples, the phishing exposure risk management system 110 or the security system 190 may enhance an access privilege or restore a previously revoked access privilege (e.g., grant a new or additional access privilege to the individual recipient), or deallocate a network resource (e.g., uninstall an anti-malware software program from a user device of the individual recipient) based on the observation of the reduced personalized phishing exposure score(s) over time. In some examples, a user may reduce the user's personalized phishing exposure score by completing a training or performing some other action, such as successfully recognizing and reporting phishing emails. For example, upon receiving an indication that the user has completed a recommended or prescribed training, the phishing exposure risk management system 110 can re-compute the phishing exposure risk score for the user, via the phishing exposure risk score generator 114, taking into account the completed training in the weights of the security data for the user, compute a difference between the newly computed personalized phishing exposure score(s) and the previous personalized phishing exposure score(s), and thereby influence a security protocol adjustment that frees rather than limits access privileges or unburdens rather than burdens a user device of the user with additional protective software or protective restrictions.

Figure 7:
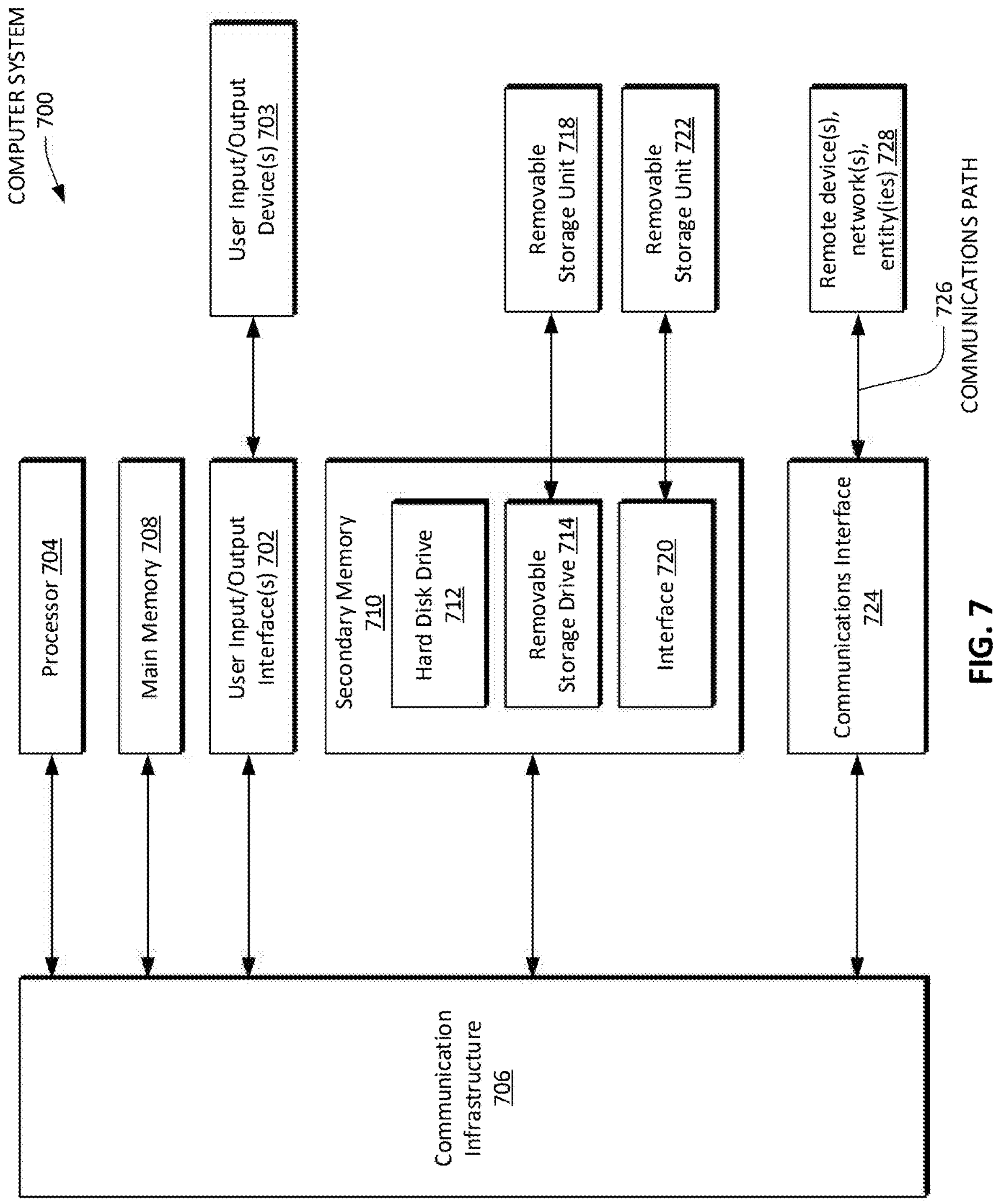
FIG. 7 is a block diagram illustrating an example computer system useful for implementing various embodiments.

Various embodiments may be implemented, for example, using one or more well-known computer systems, such as computer system 700 shown in FIG. 7. One or more computer systems 700 may be used, for example, to implement any of the embodiments discussed herein, as well as combinations and sub-combinations thereof.

Computer system 700 may include one or more processors (also called central processing units, or CPUs), such as a processor 704. Processor 704 may be connected to a communication infrastructure or bus 706.

Computer system 700 may also include user input/output device(s) 703, such as monitors, keyboards, pointing devices, etc., which may communicate with communication infrastructure 706 through user input/output interface(s) 702.

One or more of processors 704 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 may also include a main or primary memory 708, such as random access memory (RAM). Main memory 708 may include one or more levels of cache. Main memory 708 may have stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 may include a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 may read from and/or write to removable storage unit 718.

Secondary memory 710 may include other means, devices, components, instrumentalities or other approaches for allowing computer programs and/or other instructions and/or data to be accessed by computer system 700. Such means, devices, components, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 may enable computer system 700 to communicate and interact with any combination of external devices, external networks, external entities, etc. (individually and collectively referenced by reference number 728). For example, communication interface 724 may allow computer system 700 to communicate with external or remote devices 728 over communications path 726, which may be wired and/or wireless (or a combination thereof), and which may include any combination of LANs, WANs, the internet, etc. Control logic and/or data may be transmitted to and from computer system 700 via communication path 726.

Computer system 700 may also be any of a personal digital assistant (PDA), desktop workstation, laptop or notebook computer, netbook, tablet, smart phone, smart watch or other wearable, appliance, part of the internet of things (IOT), and/or embedded system, to name a few non-limiting examples, or any combination thereof.

Computer system 700 may be a client or server, accessing or hosting any applications and/or data through any delivery paradigm, including but not limited to remote or distributed cloud computing solutions; local or on-premises software ("on-premises" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 700 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method comprising:

receiving, by a computer processor, an email categorized as a suspected phishing email;

identifying from the suspected phishing email a sender or sender domain, a first recipient, and a second recipient, wherein the first and second recipients are in a network of an organization and the sender or sender domain is outside the network of the organization;

generating a first personalized phishing exposure risk score corresponding to the first recipient and a second personalized phishing exposure risk score, different from the first personalized phishing exposure risk score, corresponding to the second recipient, wherein the first personalized phishing exposure risk score represents a likelihood the first recipient will be targeted for phishing and the second personalized phishing exposure risk score represents a likelihood the second recipient will be targeted for phishing;

generating a first personalized score card for the first recipient and a second personalized score card for the second recipient, wherein the first and second personalized score cards each comprise elements to visually display, via a graphical user interface (GUI), the personalized phishing exposure risk score of the first recipient and the second recipient, respectively;

generating a first notification message for the first recipient and a second notification message for the second recipient, the first and second notification messages comprising the first personalized score card and the second personalized score card, respectively, and identifying the suspected phishing email; and transmitting the first notification message to the first recipient and the second notification message to the second recipient.

2. The method of claim 1, wherein the generating the first and second personalized phishing exposure risk scores comprises, for a corresponding recipient of the first and second recipients:

retrieving a plurality of recipient attributes for the corresponding recipient, wherein the recipient attributes are characteristics of the corresponding recipient in relation to the organization, and wherein the recipient attributes comprise one of job title, hire date, salary band, organization department, or privilege access;

retrieving security data associated with the corresponding recipient, wherein the security data contains information associated with the suspected phishing email, including the sender or sender domain;

assigning a probabilistic weight to each of the plurality of recipient attributes and the security data, wherein each probabilistic weight represents a probability the corresponding recipient will be targeted for phishing; and determining the personalized phishing exposure risk score for the corresponding recipient by combining the assigned weights, wherein the personalized phishing exposure risk score for the corresponding recipient represents a likelihood the corresponding recipient will be targeted for phishing.

3. The method of claim 2, wherein the retrieved security data associated with the corresponding recipient is generated at least in part by:

transmitting, to a user device of the corresponding recipient, at least one email subcategorized as suspicious;

retrieving, from the user device of the corresponding recipient, at least one indication of one or more interactions by the corresponding recipient with the at least one suspicious email, wherein the one or more interactions comprise following a link in the at least one suspicious email, responding to the suspicious email, opening the suspicious email, or deleting the suspicious email; and storing in a security database the at least one indication as at least a part of the security data.

4. The method of claim 2, wherein the generating the first and second phishing exposure risk scores further comprises, for the corresponding recipient:

determining, based on the security data associated with the corresponding recipient, a likelihood the corresponding recipient will fail a phishing attack, wherein failing the phishing attack comprises the corresponding recipient interacting with a phishing email such that compromising data is provided to a sender of the phishing email, wherein the personalized phishing exposure risk score for the corresponding recipient further represents a likelihood the corresponding recipient will fail the phishing attack.

5. The method of claim 4, wherein the likelihood the corresponding recipient will fail the phishing attack is calculated using a naive Bayes algorithm with the security data used as an input.

6. The method of claim 1, further comprising:

automatically allocating a network resource to the first recipient and not the second recipient based on the first and second personalized phishing exposure risk scores.

7. The method of claim 1, further comprising:

automatically limiting an access privilege of the first recipient and not the second recipient based on the first and second personalized phishing exposure risk scores.

8. A system comprising:

a memory; and at least one processor coupled to the memory and configured to:

receive an email categorized as a suspected phishing email;

identify from the suspected phishing email a sender or sender domain, a first recipient, and a second recipient, wherein the first and second recipients are in a network of an organization and the sender or sender domain is outside the network of the organization;

generate a first personalized phishing exposure risk score corresponding to the first recipient and a second personalized phishing exposure risk score, different from the first personalized phishing exposure risk score, corresponding to the second recipient, wherein the first personalized phishing exposure risk score represents a likelihood the first recipient will be targeted for phishing and the second personalized phishing exposure risk score represents a likelihood the second recipient will be targeted for phishing;

generate a first personalized score card for the first recipient and a second personalized score card for the second recipient, wherein the first and second personalized score cards each comprise elements to visually display, via a graphical user interface (GUI), the personalized phishing exposure risk score of the first recipient and the second recipient, respectively;

generate a first notification message for the first recipient and a second notification message for the second recipient, the first and second notification messages comprising the first personalized score card and the second personalized score card, respectively, and identifying the suspected phishing email; and transmit the first notification message to the first recipient and the second notification message to the second recipient.

9. The system of claim 8, wherein the generating the first and second personalized phishing exposure risk scores comprises, for a corresponding recipient of the first and second recipients:

retrieving a plurality of recipient attributes for the corresponding recipient, wherein the recipient attributes are characteristics of the corresponding recipient in relation to the organization, and wherein the recipient attributes comprise one of job title, hire date, salary band, organization department, or privilege access;

retrieving security data associated with the corresponding recipient, wherein the security data contains information associated with the suspected phishing email, including the sender or sender domain;

assigning a probabilistic weight to each of the plurality of recipient attributes and the security data, wherein each probabilistic weight represents a probability the corresponding recipient will be targeted for phishing; and determining the personalized phishing exposure risk score for the corresponding recipient by combining the assigned weights, wherein the personalized phishing exposure risk score for the corresponding recipient represents a likelihood the corresponding recipient will be targeted for phishing.

10. The system of claim 9, wherein the retrieved security data associated with the corresponding recipient is generated at least in part by:

transmitting, to a user device of the corresponding recipient, at least one email subcategorized as suspicious;

retrieving, from the user device of the corresponding recipient, at least one indication of one or more interactions by the corresponding recipient with the suspicious email, wherein the one or more interactions comprise following a link in the at least one suspicious email, responding to the suspicious email, opening the suspicious email, or deleting the suspicious email; and storing in a security database the at least one indication as at least a part of the security data.

11. The system of claim 9, wherein the at least one processor is further configured to:

determine, based on the security data associated with the corresponding recipient, a likelihood the corresponding recipient will fail the phishing attack, wherein failing the phishing attack comprises the corresponding recipient interacting with a phishing email such that compromising data is provided to a sender of the phishing email, wherein the personalized phishing exposure risk score for the corresponding recipient further represents a likelihood the corresponding recipient will fail the phishing attack.

12. The system of claim 11, wherein the likelihood the corresponding recipient will fail the phishing attack is calculated using a naive Bayes algorithm with the security data used as an input.

13. The system of claim 8, wherein the at least one processor is further configured to:

automatically allocate a network resource to the first recipient and not the second recipient based on the first and second personalized phishing exposure risk scores.

14. The system of claim 8, wherein the at least one processor is further configured to:

automatically limit an access privilege of the first recipient and not the second recipient based on the first and second personalized phishing exposure risk scores.

15. A non-transitory computer-readable device having instructions stored thereon that, when executed by at least one computing device, cause the at least one computing device to perform operations comprising:

receiving an email categorized as a suspected phishing email;

identifying from the suspected phishing email a sender or sender domain, a first recipient, and a second recipient, wherein the first and second recipients are in a network of an organization and the sender or sender domain is outside the network of the organization;

generating a first personalized phishing exposure risk score corresponding to the first recipient and a second personalized phishing exposure risk score, different from the first personalized phishing exposure risk score, corresponding to the second recipient, wherein the first personalized phishing exposure risk score represents a likelihood the first recipient will be targeted for phishing and the second personalized phishing exposure risk score represents a likelihood the second recipient will be targeted for phishing;

generating a first personalized score card for the first recipient and a second personalized score card for the second recipient, wherein the first and second personalized score cards each comprise elements to visually display, via a graphical user interface (GUI), the personalized phishing exposure risk score of the first recipient and the second recipient, respectively;

generating a first notification message for the first recipient and a second notification message for the second recipient, the first and second notification messages comprising the first personalized score card and the second personalized score card, respectively, and identifying the suspected phishing email; and transmitting the first notification message to the first recipient and the second notification message to the second recipient.

16. The non-transitory computer-readable device of claim 15, wherein the generating the first and second personalized phishing exposure risk scores comprises, for a corresponding recipient of the first and second recipients:

retrieving a plurality of recipient attributes for the corresponding recipient, wherein the recipient attributes are characteristics of the corresponding recipient in relation to the organization, and wherein the recipient attributes comprise one of job title, hire date, salary band, organization department, or privilege access;

retrieving security data associated with the corresponding recipient, wherein the security data contains information associated with the suspected phishing email, including the sender or sender domain;

assigning a probabilistic weight to each of the plurality of recipient attributes and the security data, wherein each probabilistic weight represents a probability the corresponding recipient will be targeted for phishing; and determining the personalized phishing exposure risk score for the corresponding recipient by combining the assigned weights, wherein the personalized phishing exposure risk score for the corresponding recipient represents a likelihood the corresponding recipient will be targeted for phishing.

17. The non-transitory computer-readable device of claim 16, wherein the retrieved security data associated with the corresponding recipient is generated at least in part by:

transmitting, to a user device of the corresponding recipient, at least one email subcategorized as suspicious;

retrieving, from the user device of the corresponding recipient, at least one indication of one or more interactions by the corresponding recipient with the at least one suspicious email, wherein the one or more interactions comprise selecting a link in the at least one suspicious email, responding to the suspicious email, opening the suspicious email, or deleting the suspicious email; and storing in a security database the at least one indication as at least a part of the security data.

18. The non-transitory computer-readable device of claim 16, the operations further comprising:

determining, based on the security data associated with the corresponding recipient, a likelihood the corresponding recipient will fail a phishing attack, wherein failing the phishing attack comprises the corresponding recipient interacting with a phishing email such that compromising data is provided to a sender of the phishing email, wherein the personalized phishing exposure risk score for the corresponding recipient further represents a likelihood the corresponding recipient will fail the phishing attack.

19. The non-transitory computer-readable device of claim 15, the operations further comprising:

automatically allocating a network resource to the first recipient and not the second recipient based on the first and second personalized phishing exposure risk scores.

20. The non-transitory computer-readable device of claim 15, the operations further comprising:

automatically limiting an access privilege of the first recipient and not the second recipient based on the first and second personalized phishing exposure risk scores.

* * * * *